United States Patent [19]

Packard et al.

[11] 4,002,909
[45] Jan. 11, 1977

[54] DATA ANALYZING SYSTEM HAVING PROVISION FOR OPTIMIZING COUNTING CONDITIONS AND THUS IMPROVING STATISTICAL COUNTING VALIDITY FOR ENABLING ACCURATE COMPUTATION OF SAMPLE ACTIVITY LEVELS IN LIQUID SCINTILLATION SPECTROMETRY

[75] Inventors: Lyle E. Packard, Hinsdale; Edward F. Polic, Lyle; Robert E. Cavanaugh, Jr., La Grange Park, all of Ill.

[73] Assignee: Packard Instrument Company, Inc., Downers Grove, Ill.

[22] Filed: Sept. 28, 1967

[21] Appl. No.: 674,083

[52] U.S. Cl. .............................. 250/328; 250/369
[51] Int. Cl.[2] ......................................... G01T 7/08
[58] Field of Search ................ 250/71.5 R, 106 SC, 250/83.3 R, 328, 369

[56] References Cited

UNITED STATES PATENTS

| | | | |
|---|---|---|---|
| 3,114,835 | 12/1963 | Packard | 250/71.5 |
| 3,270,205 | 8/1966 | Ladd et al. | 250/71.5 |
| 3,381,130 | 4/1968 | Nather | 250/71.5 |
| 3,428,804 | 2/1969 | Comunnetti | 250/71.5 |

Primary Examiner—Archie R. Borchelt
Attorney, Agent, or Firm—Leydig, Voit, Osann, Mayer & Holt, Ltd.

[57] ABSTRACT

A data analyzing system for scintillation spectrometers of the type for measuring activity levels of samples containing radioactive isotopes and subjected to varying degrees of quench, including methods and apparatus for optimizing counting conditions and thereby improving statistical counting validity irrespective of the degree of quenching present in any given sample, and wherein a measured parameter indicative of the effective quench condition of each sample is utilized to automatically adjust, by preselected preset amounts, the counting window for any given isotope relative to the observed energy spectrum for that isotope. Various methods and apparatus are described which, although suitable for optimizing counting conditions for both multiple-labeled and single-labeled test samples, are particularly effective in creating significantly improved isotope separations when dealing with multiple-labeled samples — for example, a double-labeled sample containing tritium ($^3H$) and carbon-14 ($^{14}C$).

28 Claims, 21 Drawing Figures

INVENTORS.
LYLE E. PACKARD
EDWARD F. POLIC
ROBERT E. CAVANAUGH, JR.
BY Wolfe, Hubbard, Voit & Osann
ATTORNEYS.

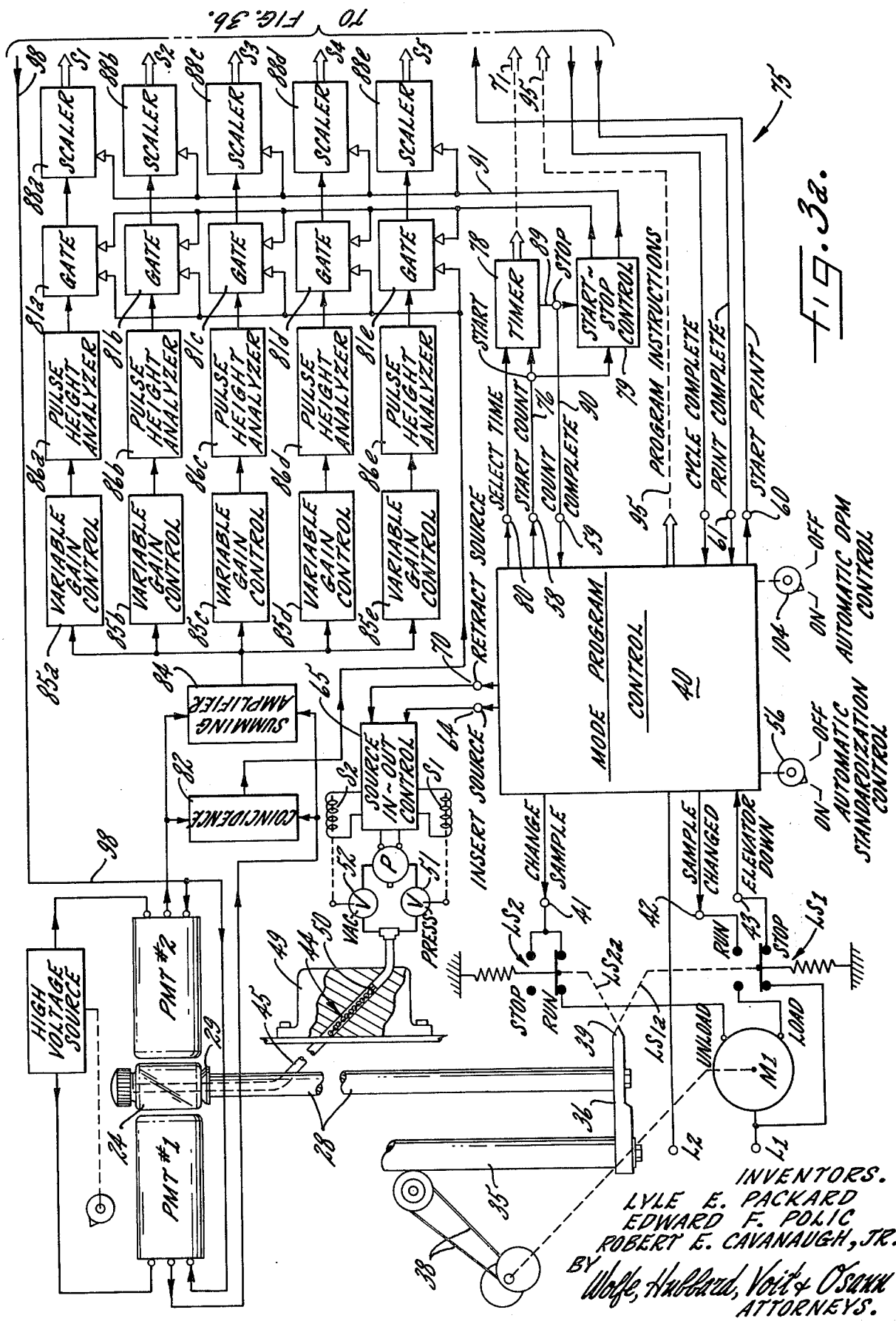

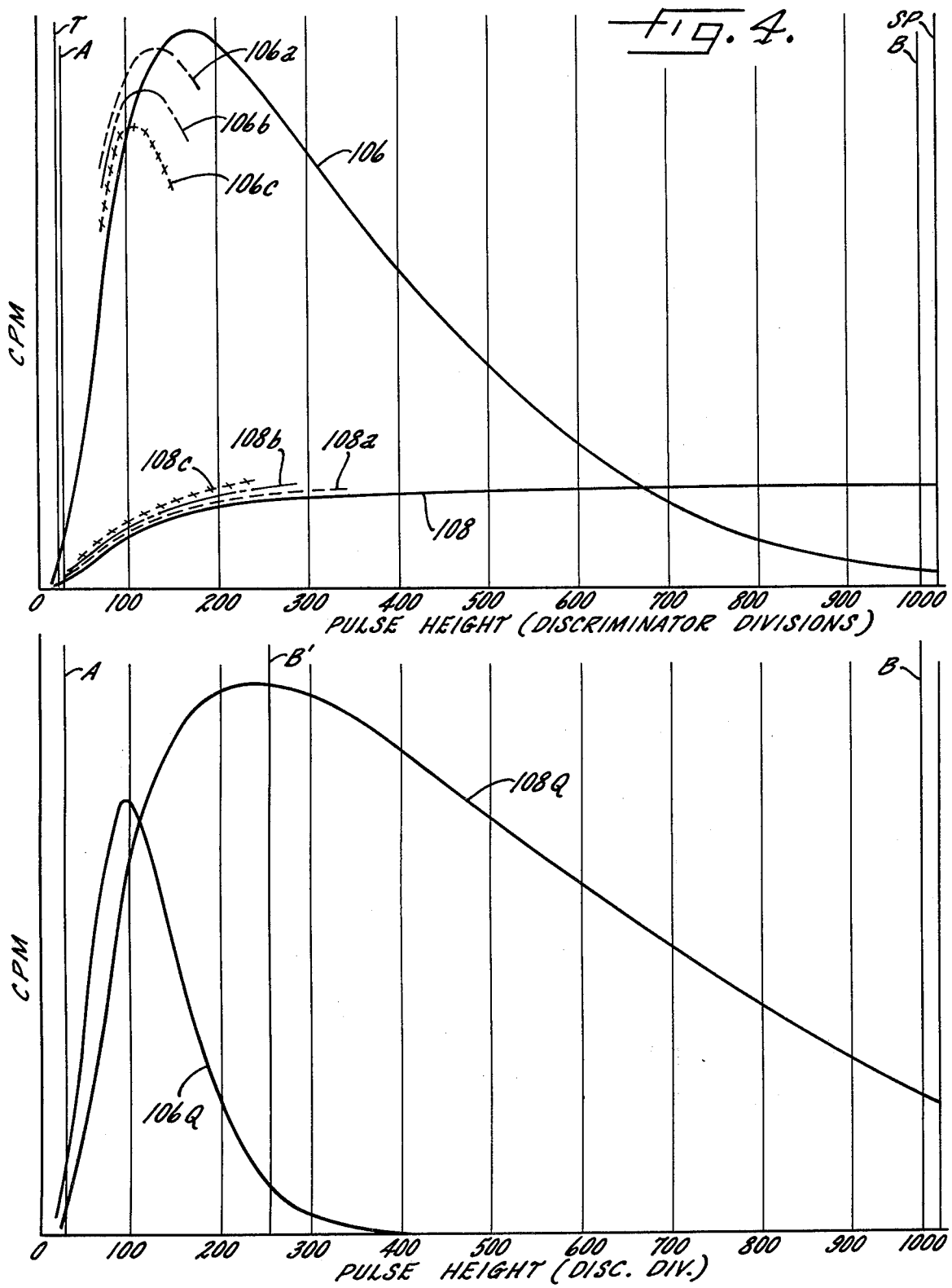

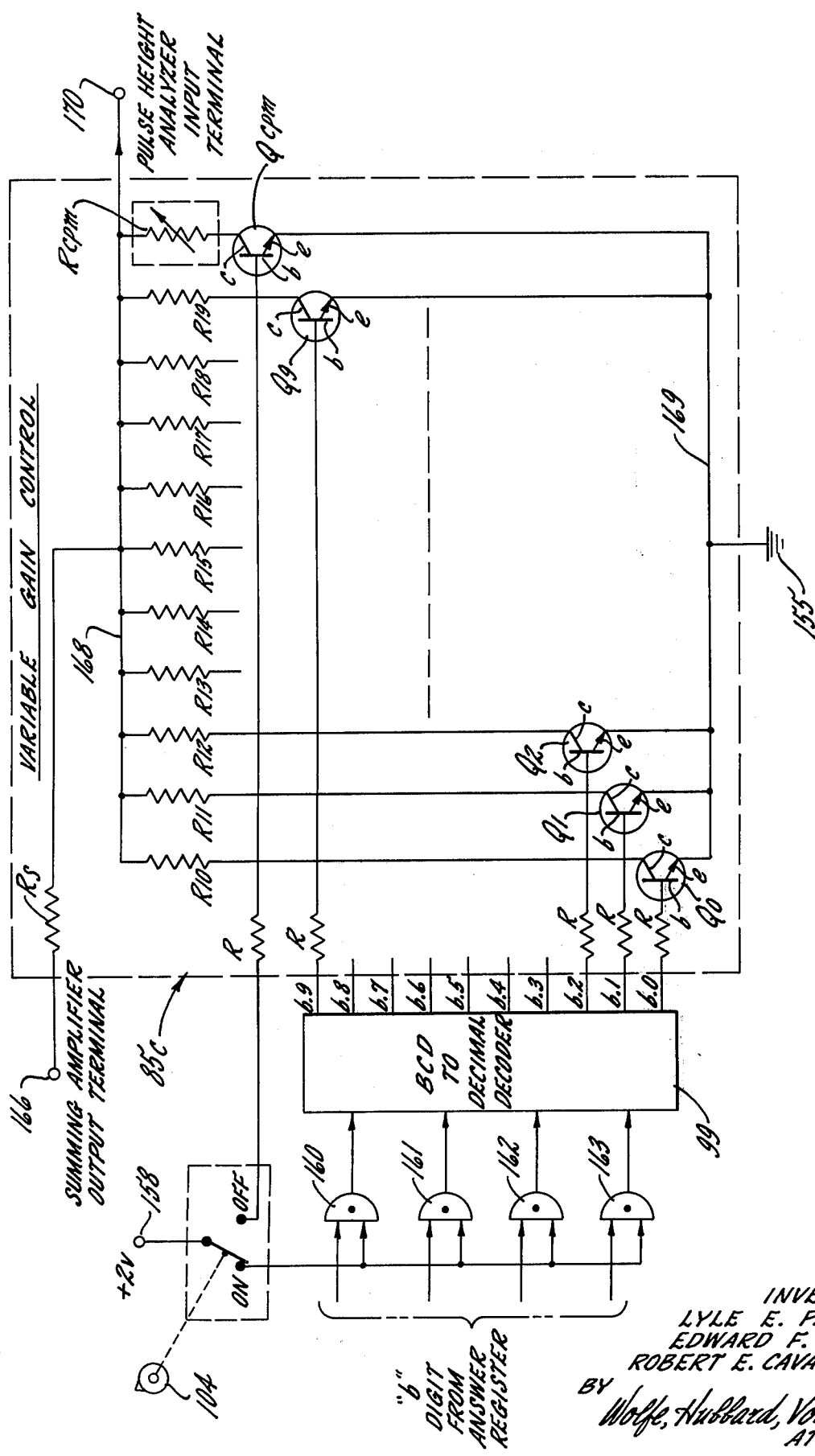

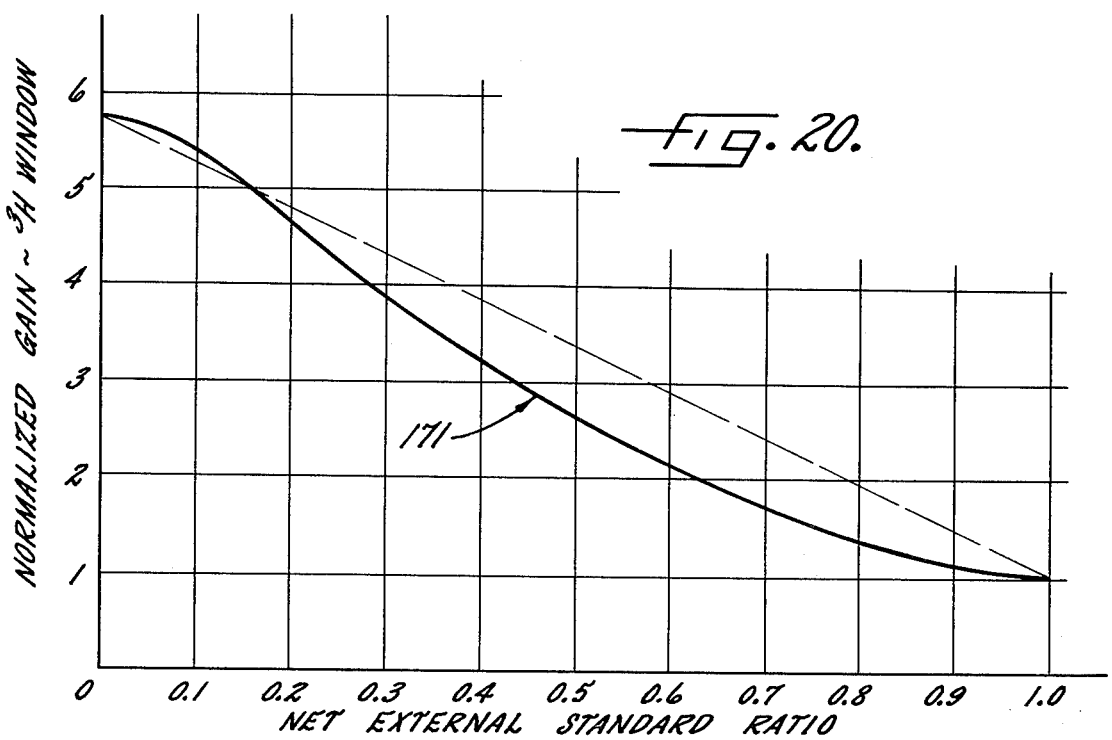

DATA ANALYZING SYSTEM HAVING PROVISION FOR OPTIMIZING COUNTING CONDITIONS AND THUS IMPROVING STATISTICAL COUNTING VALIDITY FOR ENABLING ACCURATE COMPUTATION OF SAMPLE ACTIVITY LEVELS IN LIQUID SCINTILLATION SPECTROMETRY

CROSS REFERENCE TO RELATED APPLICATIONS

Robert E. Cavanaugh, Jr., Ser. No. 541,721, filed Apr. 11, 1966. Stanley M. Bristol, Ser. No. 629,462, filed Apr. 10, 1967. Robert E. Cavanaugh, Jr., Ser. No. 630,891, filed Apr. 14, 1967. Lyle E. Packard, Ser. No. 630,892, filed Apr. 14, 1967.

BACKGROUND OF THE INVENTION

The present invention relates in general to scintillation spectral analysis of test samples containing $n$ unknown isotopes (where $n$ equals any whole integer) and, more particularly, to liquid scintillation spectral analysis techniques and equipment for analysis of samples containing $n$ isotopes disposed in a liquid scintillator which are wholly automatic in operation and wherein the counting conditions are automatically optimized for each sample in response to determination of the effective quench level for each sample so that optimum counting conditions are attained irrespective of the actual quench level of each such sample. By the phrase "optimized counting conditions" it is meant that for multiple-labeled samples the ratio of the counting efficiency for each particular isotope to the counting efficiencies for all other isotopes in the sample is maximized in the counting window for that particular isotope while the counting efficiencies for the other isotopes are maintained constant in that particular window and, in the case of a single-labeled sample, the ratio $E^2/B$ (where E is efficiency and B is background) is maximized, thus enhancing the statistical validity of a count in a given counting window for a given counting period. In its principal aspects, the invention is concerned with improved methods and apparatus for automatically adjusting, by predetermined preset amounts, the isotope counting window relative to the observed energy spectrum for any given isotope, such adjustment being made in response to detection of a measured parameter indicative of the effective quench level for each sample, whereby optimum counting conditions are created for each sample and for each isotope irrespective of the actual quench condition for each such sample.

Modern apparatus for detecting and measuring radioactivity has reached an unusually high state of development with systems currently available which offer unusual sensitivity to low energy radiation, as well as various options of full automation, semi-automation, or the more economical manual operating version. In a relatively few years, great strides have been made towards improving the preciseness and accuracy of counting efficiency in compliance with the very stringent requirements of users of this highly technical and sophisticated equipment. However, certain problems have continued to plague both the manufacturers and users of such equipment. A particularly prevalent and vexing problem has been the error introduced into computations of true sample activity levels because of a phenomenon commonly encountered with liquid scintillation samples known as "quenching". Stated very simply, this phenomenon results in attenuation of light scintillations within the samples, thus significantly affecting the statistical accuracy of the equipment which determined activity levels based upon the number and energy of such light scintillations, the latter being counted over known units of time and being proportional in energy to the energy of the disintegrations which produce them.

Many efforts have heretofore been made to minimize and, preferably, to eliminate, the errors which result from the quench phenomenon, some of which have completely failed and others of which have met with varying degrees of success and acceptance. One principal effort that has heretofore been made towards minimizing the quench problem has been that of development of various constituents which make up the sample and which are as free of quench characteristics as possible. Such constituents include, without limitation thereto, scintillation substances, solvents, and the material from which the light transmissive sample vial is made. However, perfect light transmitters completely devoid of quench characteristics are simply not available, and even if they were, the problem would remain since the test specimen itself may, and often will, contain quench materials such, for example, as blood or urine, which tend to attenuate the light because of their color. Moreover, unless the detection system is maintained in a completely enclosed atmosphere of an inert gas such as argon, quench can occur simply because of the presence of air.

Faced with the seeming impossibility of eliminating the quench phenomenon as a source of error, numerous efforts have been made to cope with the problem by providing methods and apparatus for compensating for such errors. Typical systems which are currently employed and which have found great acceptance today by people employing this sophisticated equipment include systems in which an external standard source which emits highly penetrating radiations is placed adjacent the sample in the detection chamber during a portion only of its overall counting cycle. Light scintillations occurring in the sample are then counted during at least two discrete intervals, during one of which the scintillations are created only by the isotope in the sample and during the other of which the scintillations are created by the composite effect of the isotope and the external standard. Suitable electronic equipment is provided for separating the pulses from the two sources on the basis of their different energy levels and, therefore, those which are counted primarily from the external standard provide a fairly accurate indication of the degree of quenching present in the sample since the counting efficiency for such external standard is known or can be readily ascertained by use of an unquenched standard sample. Typical systems of this type are described in detail in Lyle E. Packard U.S. Pat. No. 3,318,468, issued June 8, 1965, as well as in the aforesaid Cavanaugh application Ser. No. 541,721, filed Apr. 11, 1966, both of which are assigned to the assignee of the present invention.

Both of the aforementioned prior systems are of the type which are commonly referred to as "external standardization" systems and both represent basic and significant improvements over earlier known systems described therein, such as "internal standardization" and "channels ratio" systems. In effect, however, all of these prior systems have had certain aspects which are common to one another, a principal one of which is that the measured quench correlation parameter (e.g., "net or gross external standard count," "external standard ratio," "channels ratio," etc.) generally provides an indication of the degree of quench present in the sample, which indication must then be compared with a previously prepared quench correlation curve in order to determine the counting efficiency. Once knowing the counting efficiency, the counts per minute (cpm) measured for the isotope being analyzed can be divided by counting efficiency to determine activity level in disintegrations per minute (dpm). Unfortunately, however, the quench correlation curve itself differs widely from instrument to instrument, from isotope to isotope, from channel to channel, with sample volume, and with other variable conditions. Consequently, it has been necessary to prepare many of such curves, the preparation of each one of which has been time consuming, expensive, and subject to numerous human errors. Moreover, once the curves are prepared, it is necessary that the measured quench correlation data be compared with them in order to determine counting efficiency, thus introducing even further danger of human error.

Even more significant, however, has been the fact that while such a correlation curve can be prepared, it is only as accurate as the number of points which actually define the curve. It has been established that such points simply do not fall on a straight line, or even on a smoothly curved line — quite to the contrary, the points will be non-uniformly distributed in an unpredictable random pattern which only generally defines the correlation curve. Consequently, even when the technician uses extreme care in his computations, he has been forced to extrapolate or interpolate between known points and, since the extrapolated or interpolated data can vary significantly from the actual data, the computed efficiency can still vary greatly from actual efficiency with maximum errors on the order of up to 10% and average errors on the order of up to 2% being common, dependent upon the number of differently quenched standard samples selected to prepare the quench correlation curve.

Errors of the foregoing magnitude were simply not acceptable to the highly trained technical personnel who use this general type of equipment. Indeed, such errors are highly objectionable, and the more so in view of the high state of sophistication that the overall art has reached. Indeed, these errors were tolerated only because the prior systems briefly described above, and described in considerably greater detail in the aforesaid Packard U.S. Pat. No. 3,188,468 and Cavanaugh application Ser. No. 541,721, represented the best available solutions to the problem at that time.

Continued efforts have, however, been made towards providing a more satisfactory solution to the problem. For example, it has been suggested that true activity level for a sample can be computed simply by dividing the measured variable quench correlation parameter (e.g., "external standard ratio," "net external standard count," "channels ratio," etc.) into the measured value in counts per minute (cpm) for the sample undergoing analysis. This suggestion, however, is not satisfactory for many reasons. For example, it assumes that the quench correlation curve is a straight line, which it is not. The fact that the quench correlation curve is not a straight line adds to the magnitude of such errors with the result that errors on the order of up to 25% have often been experienced and, indeed, on some occasions errors many times that magnitude have been encountered.

It has also been proposed that the problem can be resolved by servo-adjusting in any of various known manners, overall system gain and/or the high voltage supply so as to restore the measurable quench correlation parameter to a value indicative of an unquenched sample and, thereafter, analyzing the sample as if it were unquenched. Again, however, such a proposed "solution" is no solution at all since the gain correlation curves do not coincide with nor follow the quench correlation curves and, consequently, the magnitude of error can be and often will be, even greater than that experienced with the interpolation/extrapolation techniques referred to above.

Today, quite satisfactory liquid scintillation counting procedures and equipment have been devised which are capable of compensating for inaccuracies introduced by the quench phenomenon. Typical of these solutions are the procedures and equipment described in the aforesaid Packard application, Ser. No. 630,892, and Cavanaugh application, Ser. No. 630,891, both of which are assigned to the assignee of the present invention. Both of such prior applications describe, inter alia, procedures and equipment for imposing upon each sample a precisely controlled simulated quench condition which, when added to the actual quench condition for the sample, creates an accurately known effective quench level for which counting efficiencies for the isotope or isotopes being analyzed are known with a high degree of accuracy. However, effective as these solutions have been in enhancing the accuracy of the ultimate computation of sample activity level by permitting the technician to operate at a point or points where counting efficiencies are accurately known, nevertheless they still do not provide for optimum or near-optimum counting conditions and, therefore, optimized statistical validity.

Stated another way, in the case of multiple-labeled samples such as a dual-labeled sample containing tritium ($^3H$) and carbon-14 ($^{14}C$), assuming that the $^3H$ and $^{14}C$ counting windows are preset for optimum counting conditions for unquenched samples, it is known that as quenching progressively increases, the counting efficiency for tritium in both windows will be progressively degraded, while the counting efficiency for carbon in the $^3H$ window will be progressively increased to a point and in the $^{14}C$ window will be progressively degraded. Thus, isotope separation in the $^3H$ window is progressively degraded, thereby degrading counting conditions and statistical counting validity, particularly in the case of samples having relatively low tritium activity levels. Similarly, in the case of a single-labeled sample, the counting efficiency will be progressively degraded with progressively increased quench, thus degrading the ratio $E^2/B$ and, therefore, counting conditions. In either case, this results from the shift of the energy spectra for the isotopes being analyzed relative to their respective counting windows as defined by the pulse height analysis channels. While the systems described in the aforesaid Packard application Ser. No. 630,892 and Cavanaugh application Ser. No. 630,891 will permit a more accurate determination of counting efficiencies, the foregoing problem inherently causes the more accurately known efficiencies for single-labeled samples to be degraded and, for multiple-labeled samples, a similar degradation of isotope separation as samples are progressively more quenched.

This result precludes counting at optimized counting conditions and, therefore, precludes attainment of optimum or near-optimum statistical validity. On the other hand, while the known systems for servo-adjusting gain or high voltage supply will, to a degree, improve the $E^2/B$ ratio of single-labeled samples and isotope separation when dealing with multiple-labeled samples and thus improve statistical validity, they do so without any significant improvement in the accuracy of the computed sample activity level since they fail to compensate for the problem stemming from a shift of the measured parameter indicative of quench level from a point where counting efficiency is accurately known to a point where it is not.

It is a general aim of the present invention to provide an improved data analysis system which overcomes the foregoing disadvantages and which is characterized by its reliability, its rapidity of operation, its accuracy, and by its enhanced statistical validity characteristics. In this connection, it is an object of the invention to provide improved radioactivity spectrometry methods and apparatus which provide for automatic optimization of counting conditions for successive test samples irrespective of the degree of actual quench present in any given sample. While not so limited in its application, the invention will find especially advantageous use when the measured variable parameter indicative of quench conditions takes the form of net external standardization ratios, although it can also be used in connection with other measurable variable parameters which also provide an indication of the degree of quenching such, merely by way of example, as net external standard counts or net channels ratios.

Stated another way, it is a general aim of the present invention to provide improved radioactivity spectrometry methods and apparatus wherein the preset counting windows for the isotopes undergoing analysis are automatically readjusted relative to the observed energy spectra for successive samples by preset predetermined amounts selected in response to measurement of any suitable quench indicating parameter so that counting conditions are optimized automatically for each sample and for each isotope contained therein, irrespective of the actual quench level of each sample, all without requiring the attendance or attention of a technician during the analysis of successive samples having diverse quench levels on an automated basis.

As a consequence of attaining the foregoing general objectives of the invention, it has been found that when dealing with multiple-labeled samples considerably enhanced isotope separations are achieved and, when dealing with single-labeled samples, the $E^2/B$ ratio is maximized, thereby insuring greater statistical validity.

In another of its important aspects, it is an object of the invention to provide improved methods and apparatus for optimizing counting conditions in radioactivity spectrometry applications characterized by their ability to permit highly accurate determination of sample activity levels under conditions of precisely known counting efficiencies irrespective of actual sample quench conditions, so that conditions of optimum accuracy and optimum statistical validity are achieved.

A more detailed object of the invention is the provision of improved methods and apparatus suitable for use in analysis of multiple-labeled samples wherein the ratio of the counting efficiency for each particular isotope to the counting efficiencies for all other isotopes in the sample is maximized in the counting window for that particular isotope while the counting efficiencies for the other isotopes are maintaned constant in that window, thus insuring attainment of optimized counting conditions. In this connection it is a related object of the invention to provide such improved methods and apparatus which will also find advantageous use in analysis of single-labeled samples by virtue of their ability to maximize the $E^2/B$ ratio, whereby optimized counting conditions are attained.

A further and still more detailed objective of the invention is the provision of improved methods and apparatus of the character hereinabove set forth wherein provision is made for automatically readjusting by preset predetermined amounts selected window defining discriminator levels so that when analyzing multiple-labeled samples, the counting efficiencies for isotopes not of interest in any given counting window are maintained constant and, so that when analyzing single-labeled samples, the ratio $E^2/B$ is maximized. In this connection it is a correlative object of the invention to provide improved methods and apparatus of the foregoing character wherein such results are achieved by automatically readjusting gain factors independently in the diverse analyzing channels by preset predetermined amounts so as to insure that the counting efficiencies for isotopes not of interest in any given window are maintained constant in the case of multiple-labeled samples and, in the case of single-labeled samples, the ratio $E^2/B$ is maximized.

It is a more specific object of the invention to provide improved methods and apparatus for optimizing counting conditions automatically in response to measurement of a suitable quench indicating parameter, which measurement is also utilized to simulate a quench condition for any given sample so that such sample can be analyzed as if it were quenched to a level where counting efficiencies are precisely known, thus insuring not only optimum statistical validity, but also optimum computational accuracy.

Other objects and advantages of the invention will become apparent as the following description proceeds, taken in conjunction with the accompanying drawings, in which.

Figure 1:
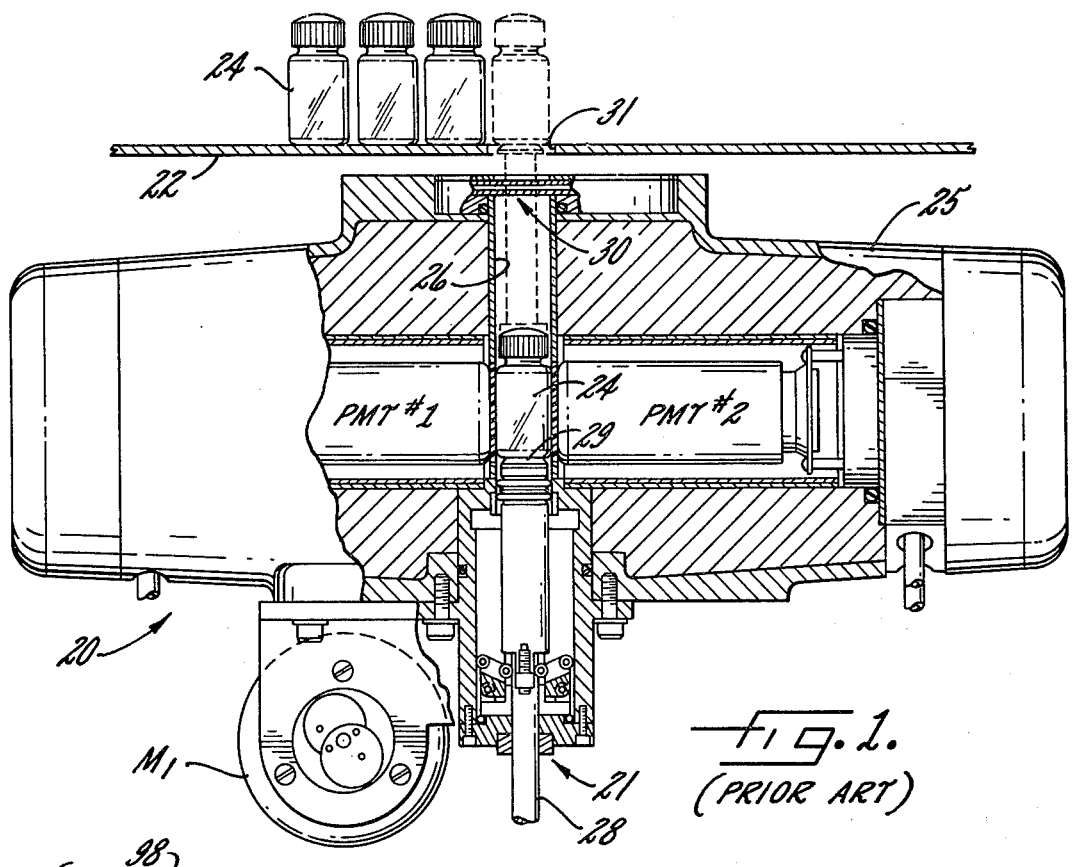
FIG. 1 is a fragmentary side elevational view, partly in section, depicting an exemplary radiation detection chamber and elevator mechanism suitable for processing samples in accordance with the present invention, the apparatus here being depicted with the elevator mechanism in the down or "sample loaded" position with the sample to be analyzed interposed between a pair of light transducers.
Figure 3B:
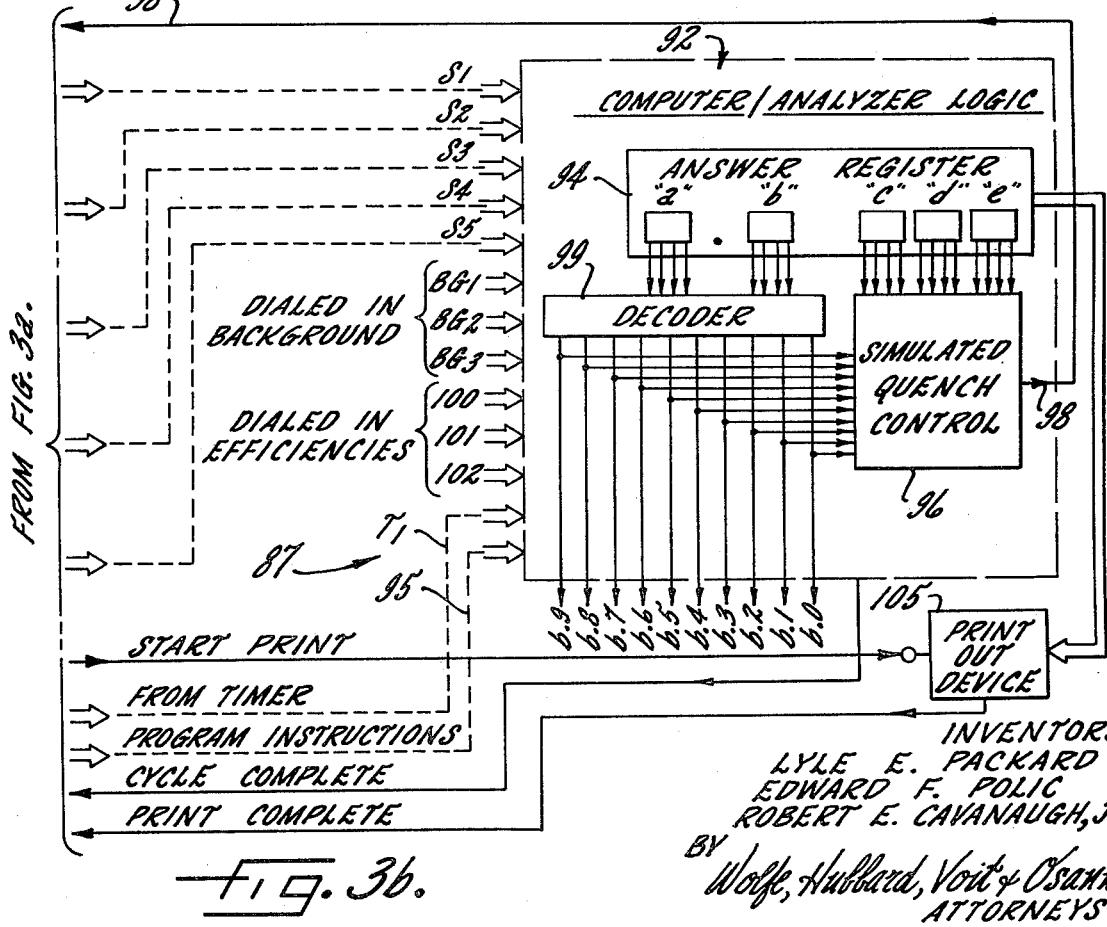
Figure 2:
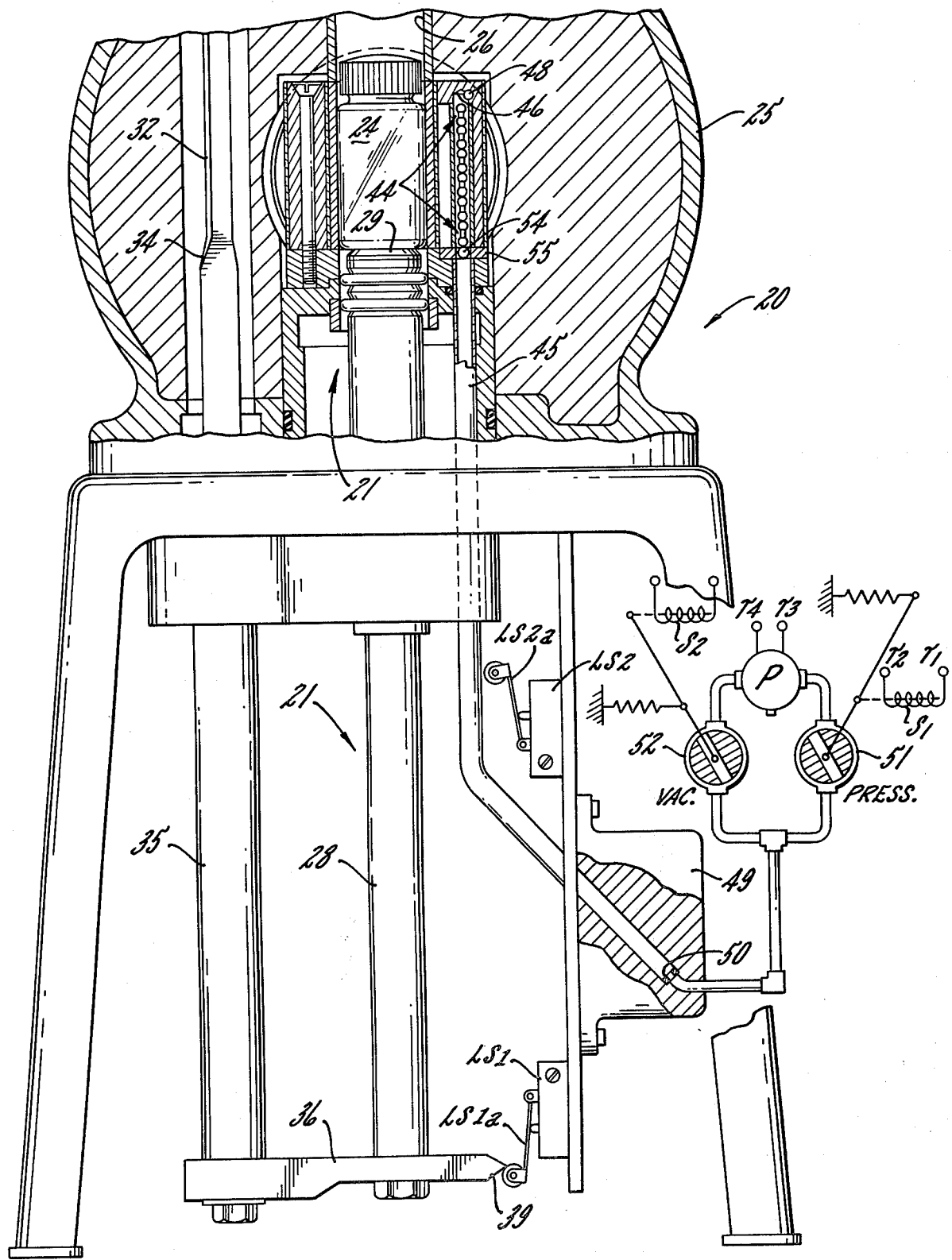
FIG. 2 is an enlarged fragmentary side elevational view, partly in section and partly in diagrammatic form, here showing a conventional apparatus for selectively positioning and recirculating external standard radioactive source material between a first position remote from and shielded from the detection chamber and a second position adjacent a sample disposed in the detection chamber.

FIGS. 3a and 3b comprise a schematic wiring diagram, partly in block form, here depicting (1) an exemplary control system for operating the elevator mechanism shown in FIGS. 1 and 2, (2) the control components utilized for positioning standard radioactive source material in a selectable one of two positions in accordance with the particular cycle of operation determined by the mode program control, (3) a conventional electrical system which accepts, counts and records the output of the radiation detector, (4) a conventional computer/analyzer logic which accepts, inter alia, the output control signals from the electrical system, and (5) a conventional print-out device shown simply in block form;

FIG. 4 is a graphic representation of typical pulse height spectra characteristic of two unquenched standard beta emitting isotopes of different energy levels, here illustrating the spectra as observed in a preset counting window and at a gain of approximately 53%;

FIG. 5 is a graphic representation similar to FIG. 4, but here illustrating the energy spectra for the same two standard beta emitting isotopes, but here under quenched conditions.

Figure 6:
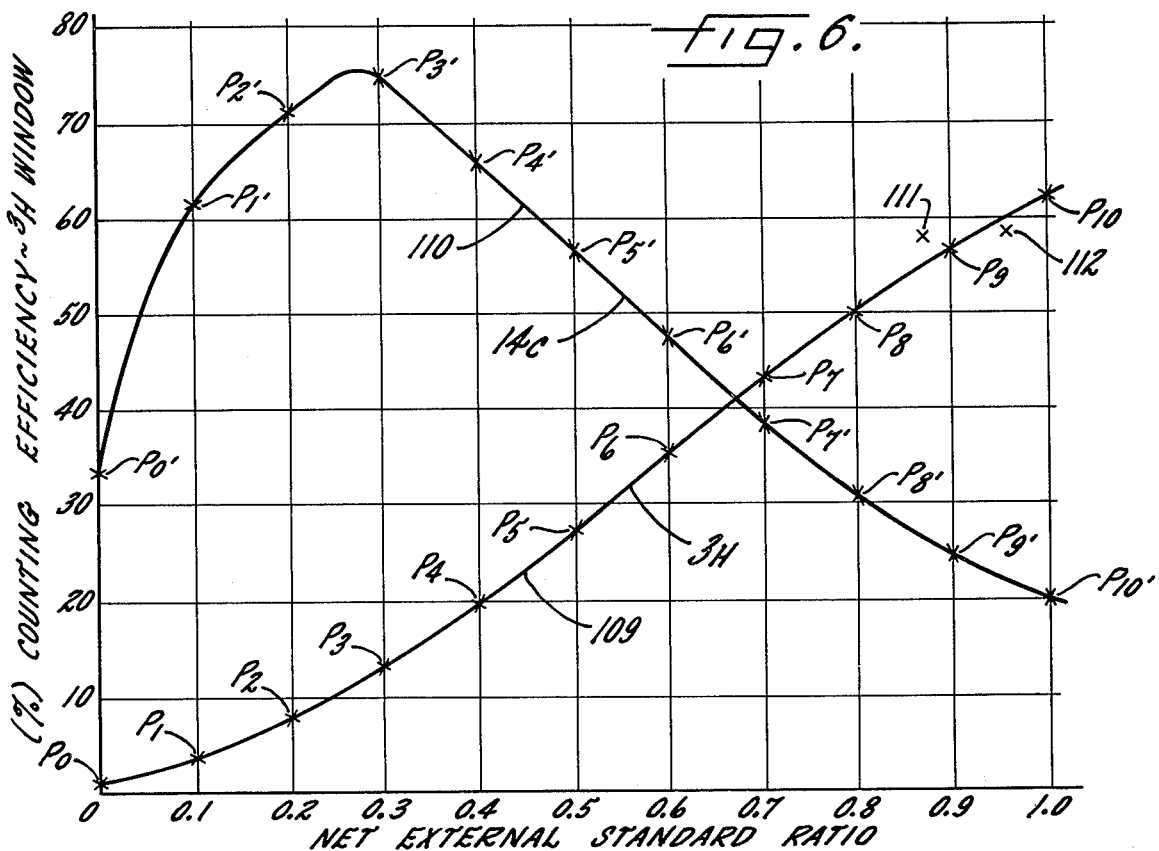
Figure 7:
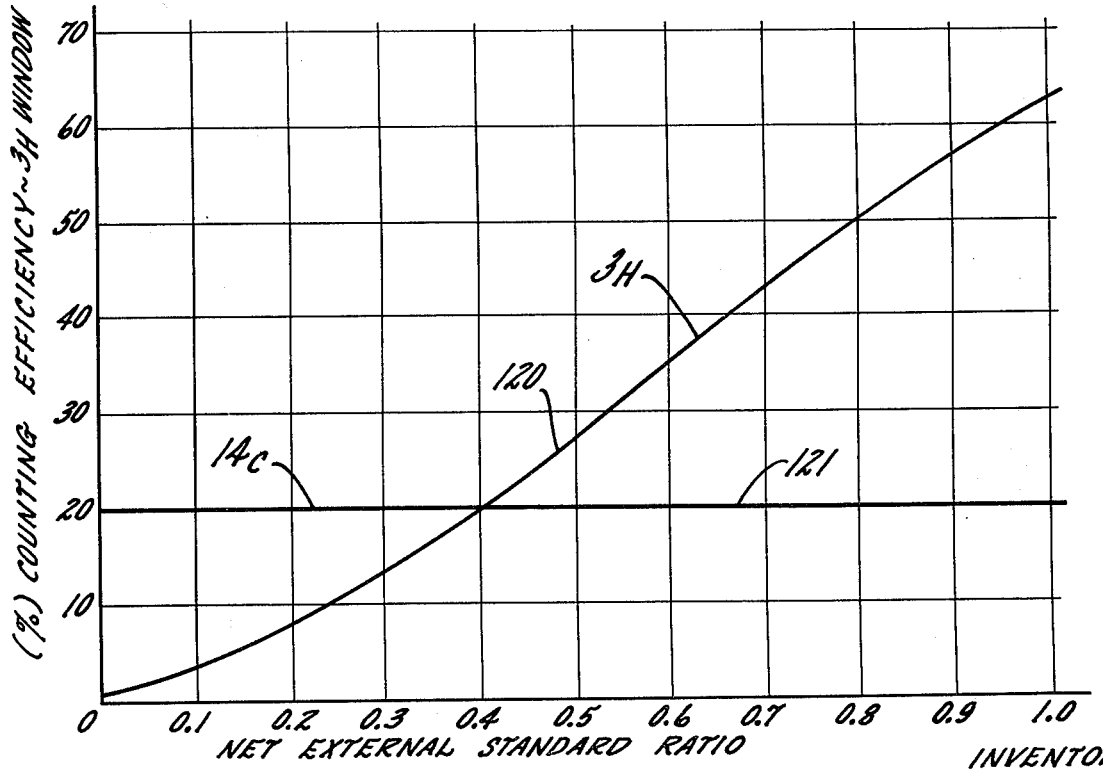
Figure 8:
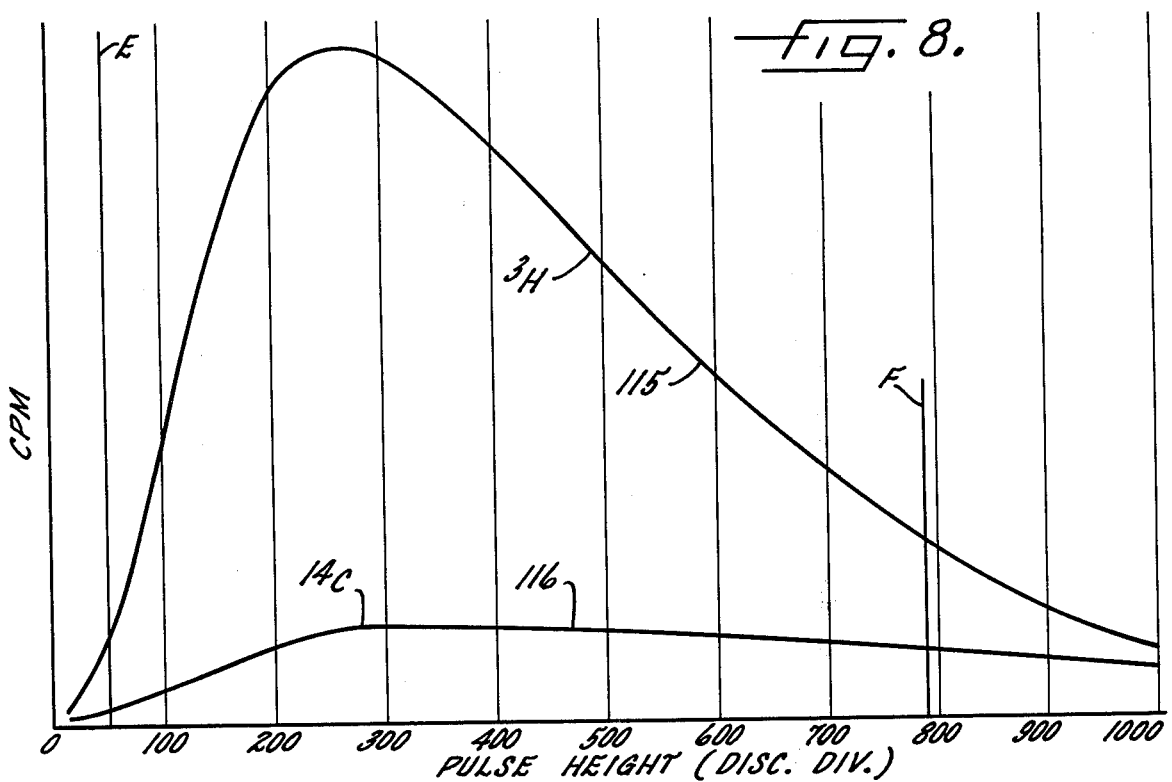
Figure 9:
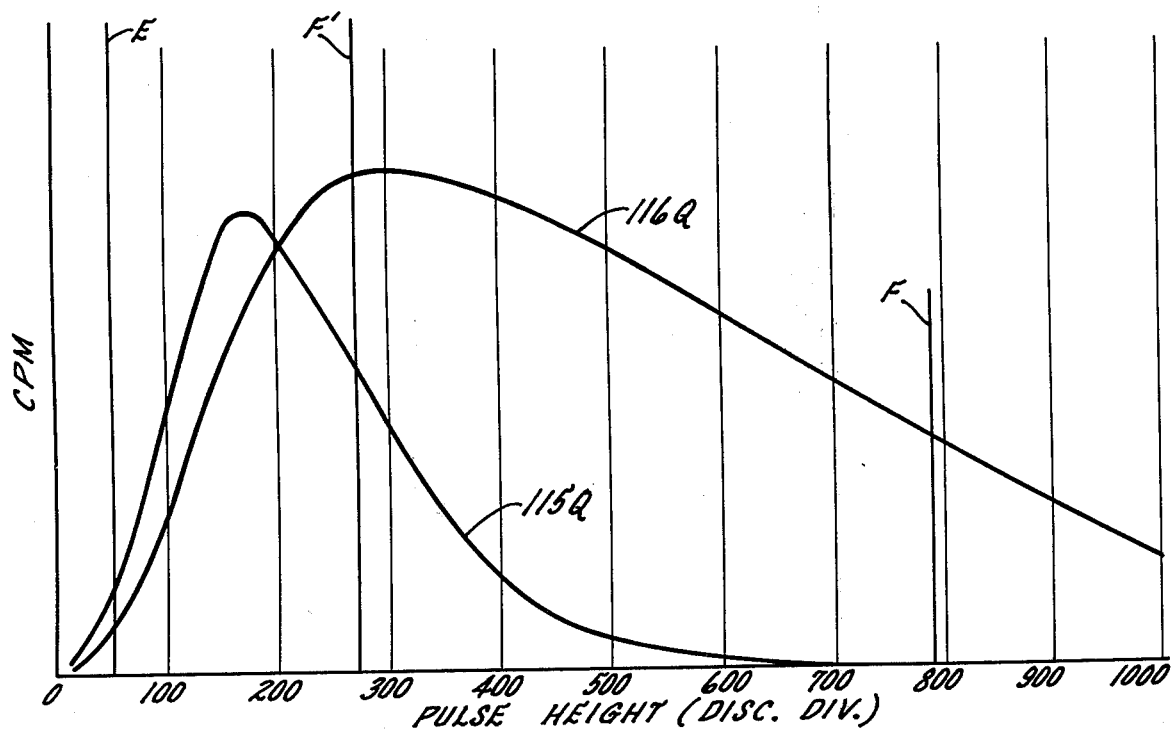
Figure 12:
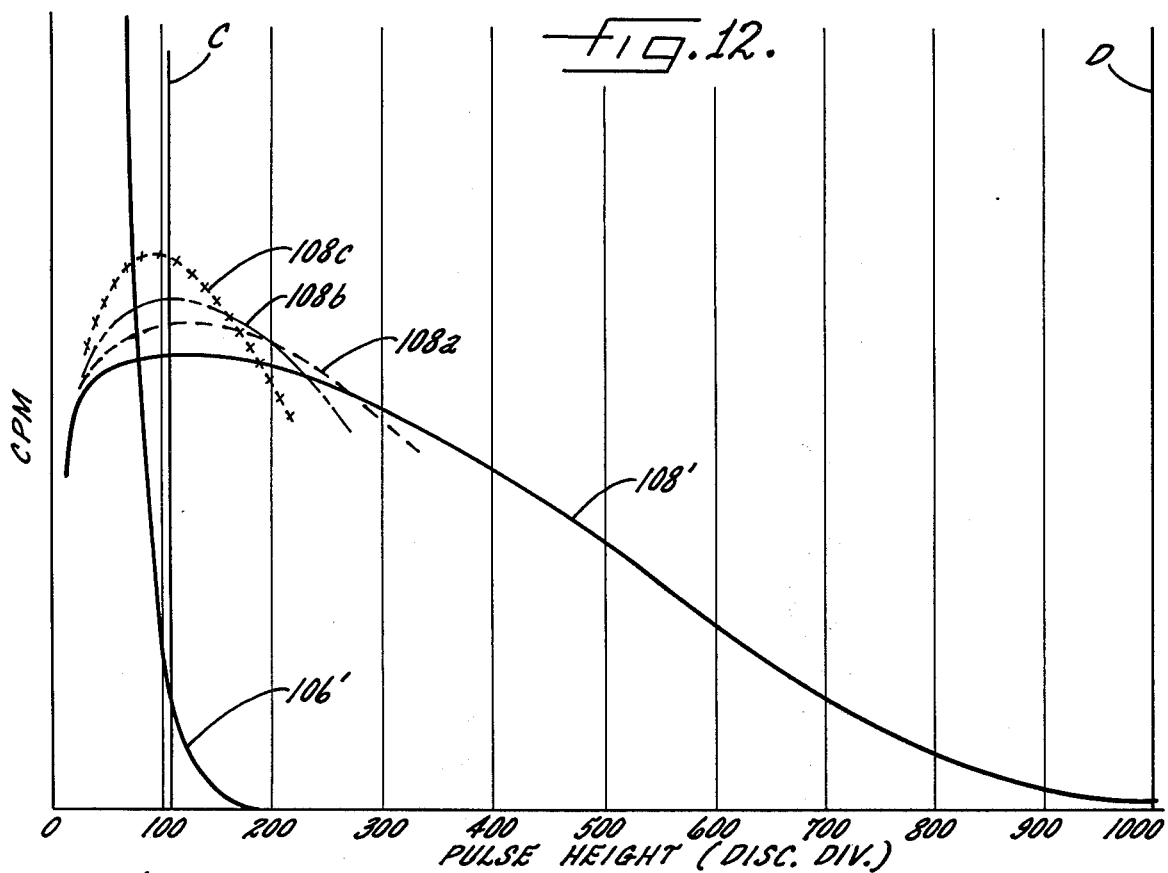
Figure 13:
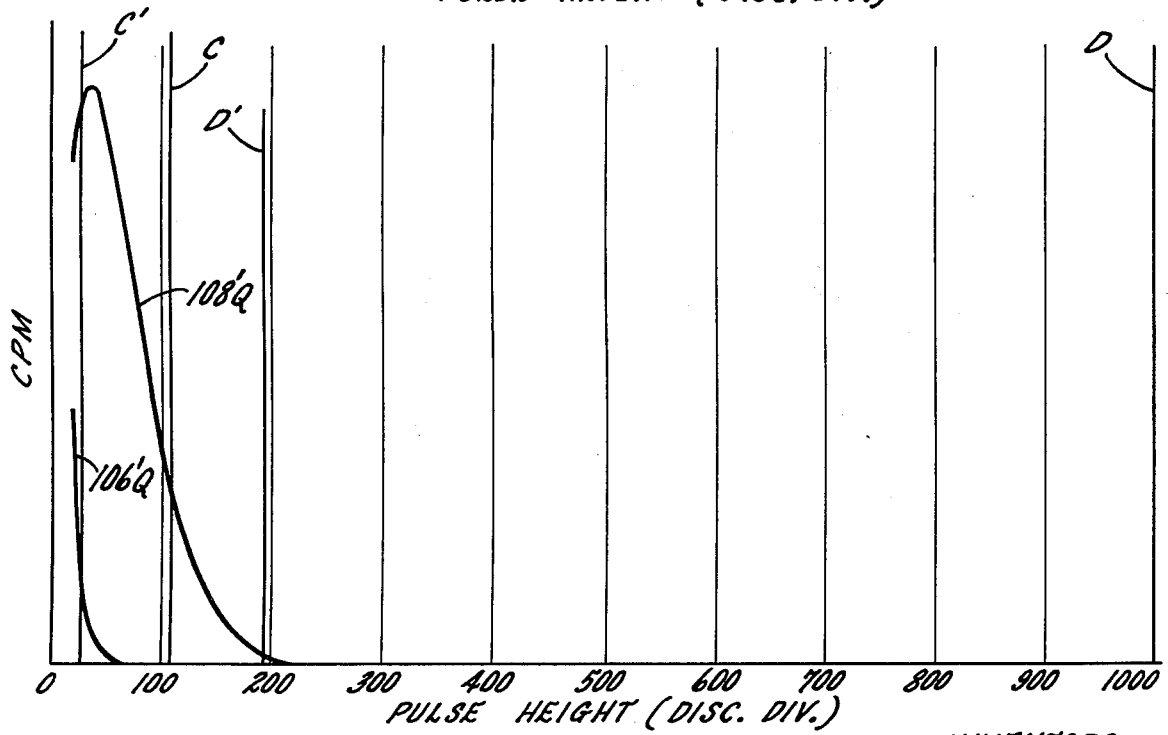
Figure 14:
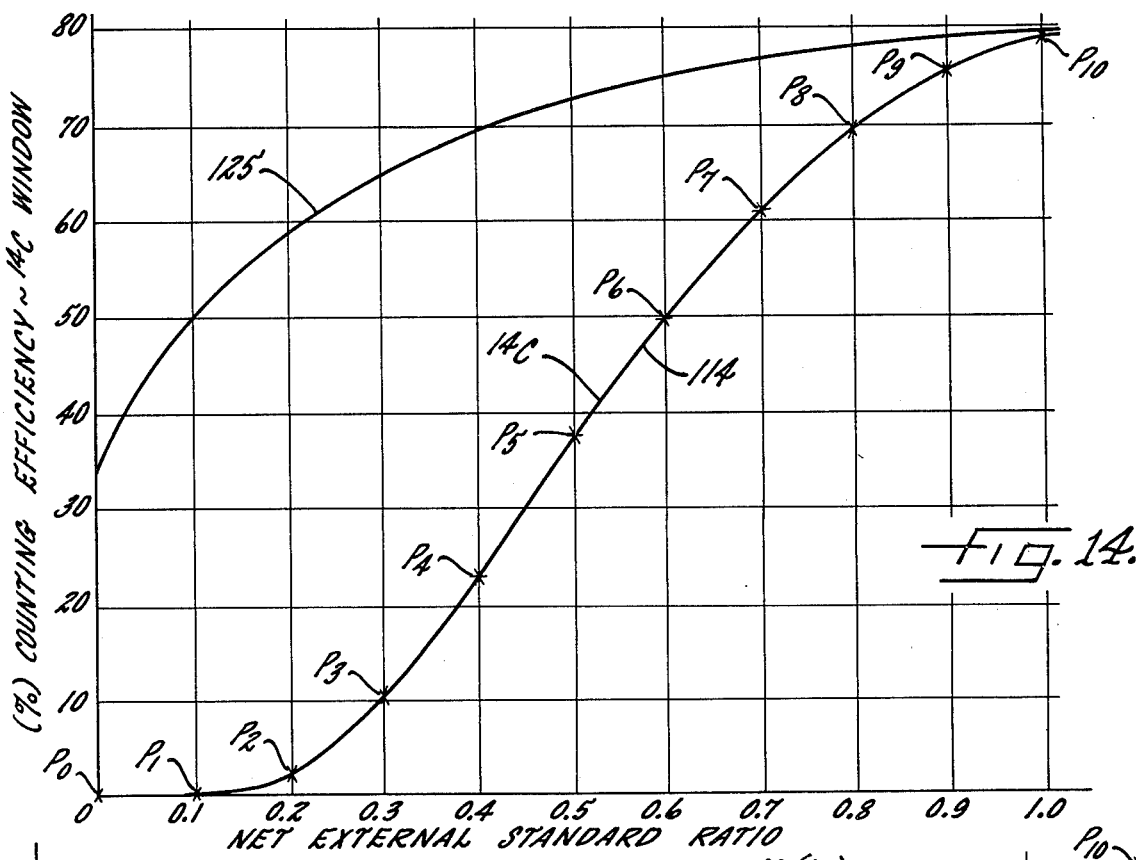
Figure 15:
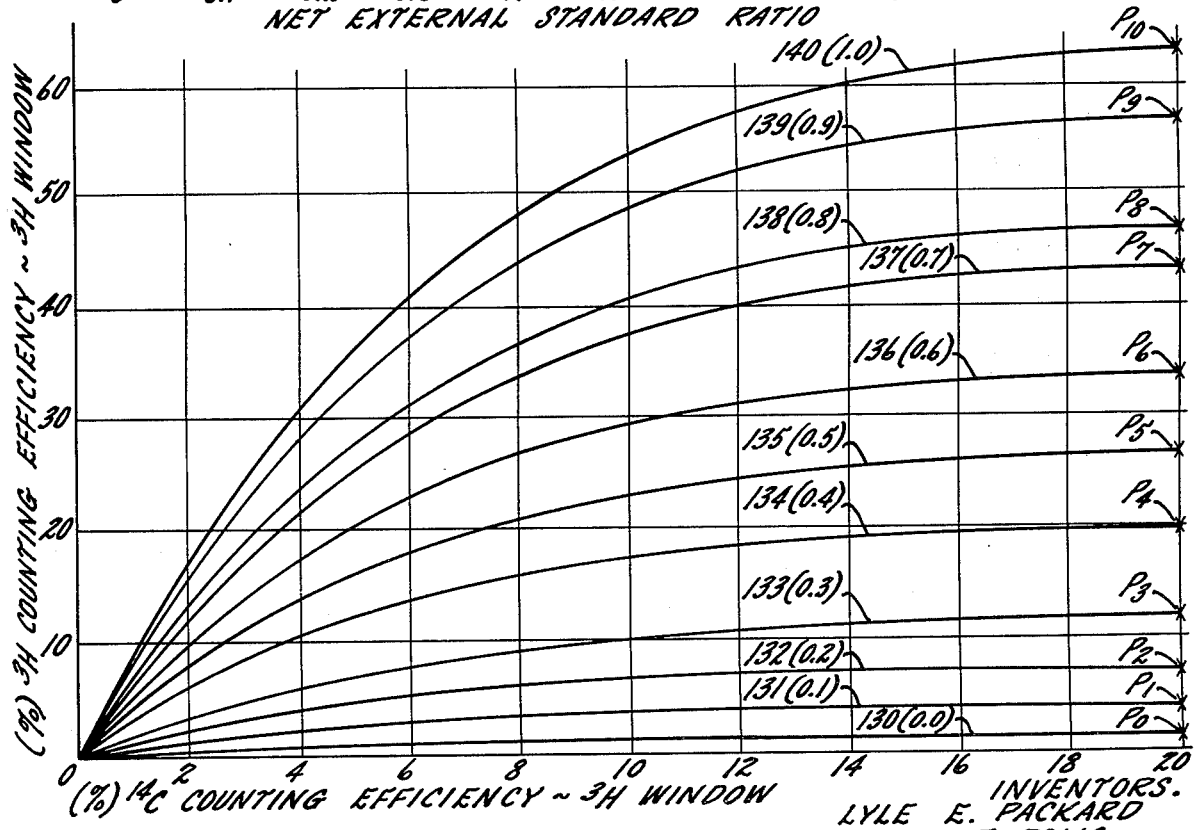
Figure 16:
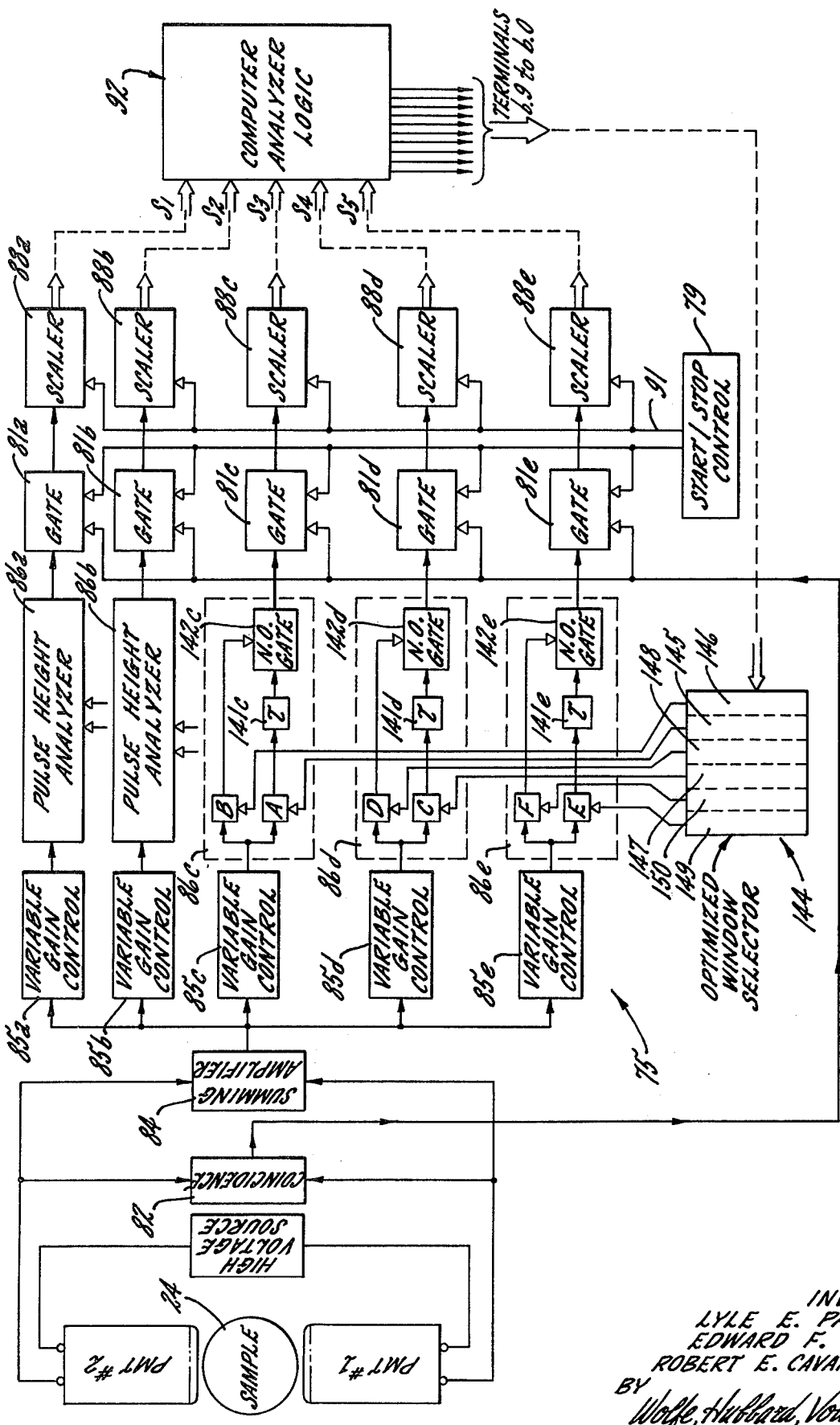
Figure 17:
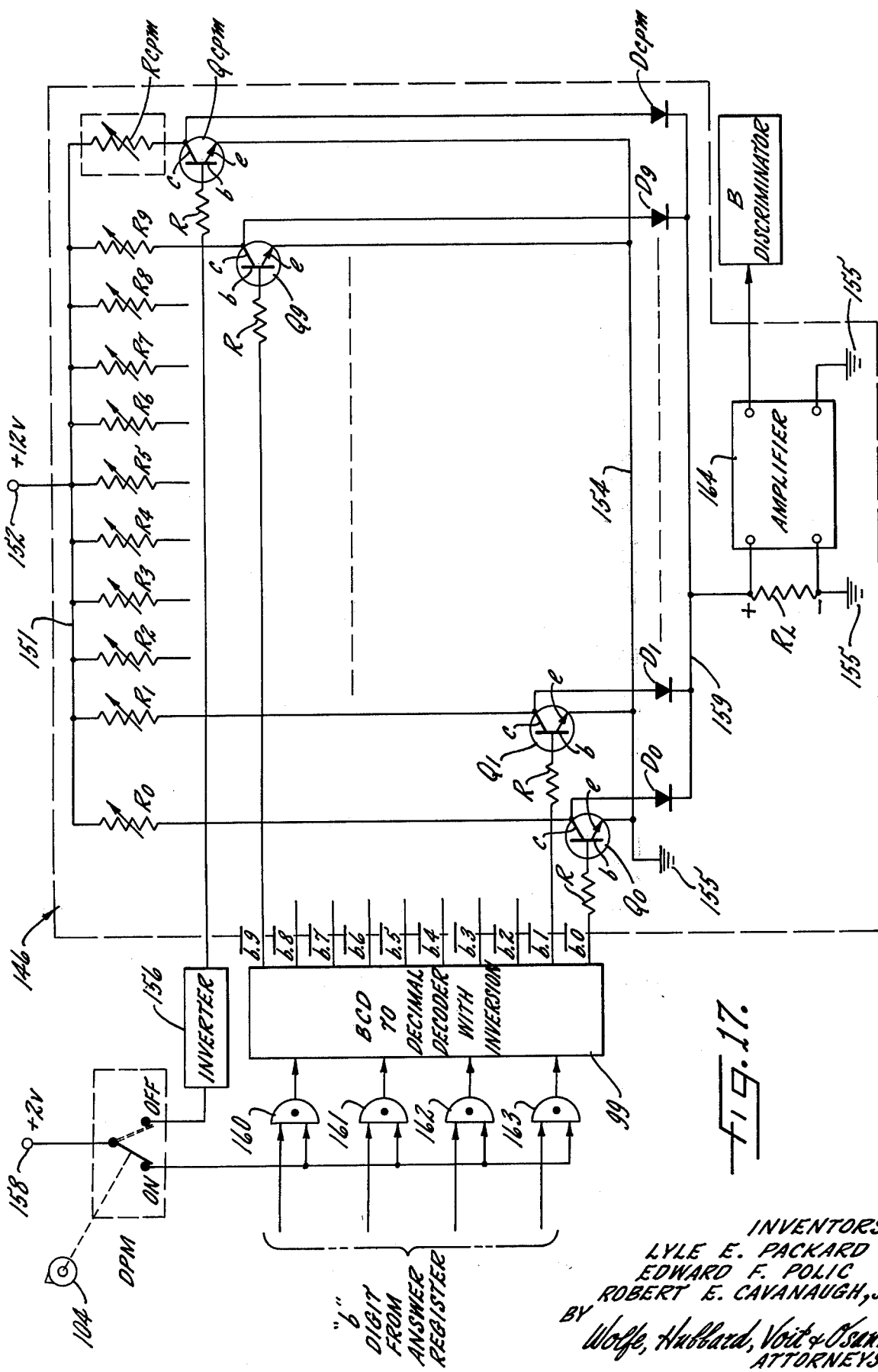
Figure 18:
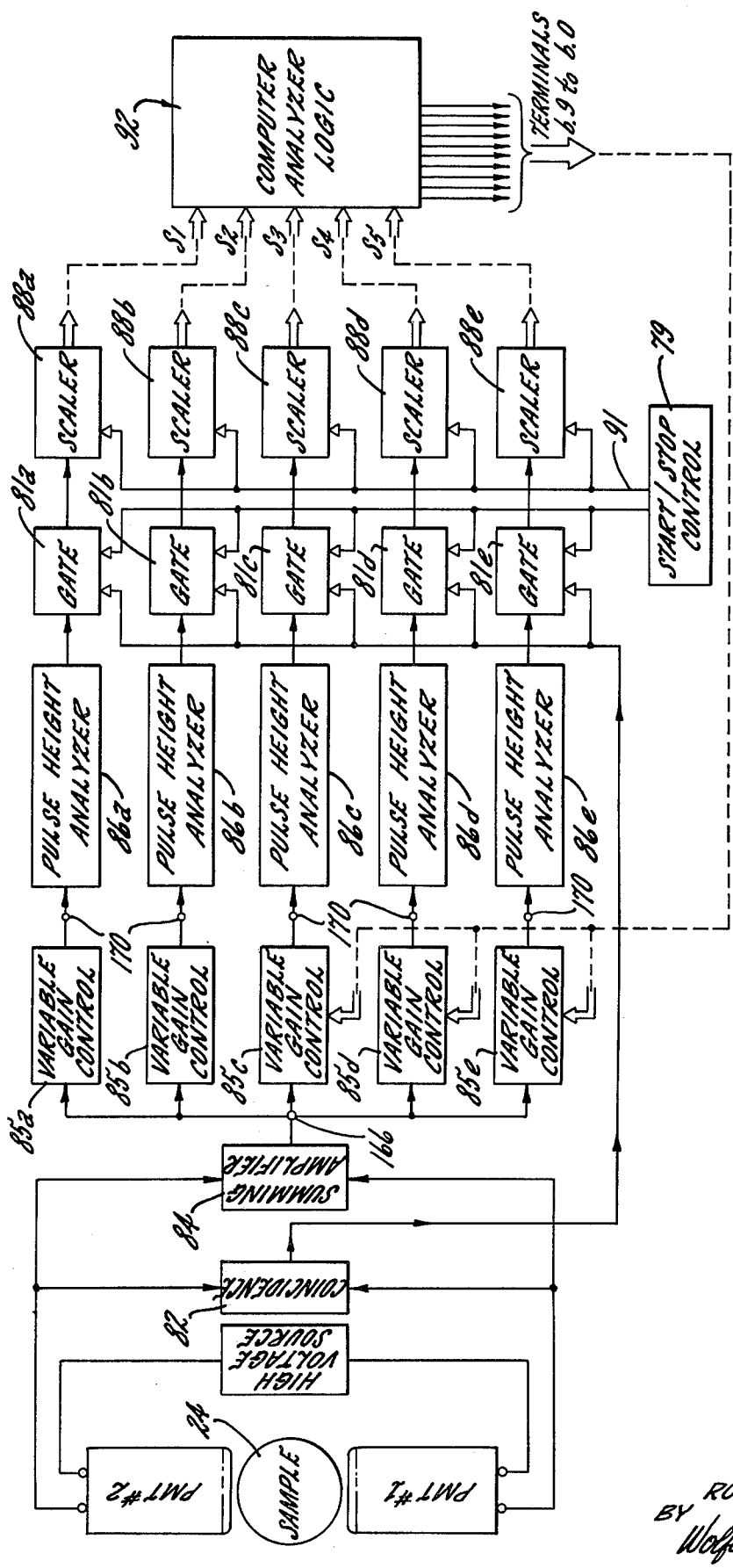

FIG. 6 is a graphic representation of a typical smooth quench correlation curve (in which the abscissa is scaled in units of net external standard ratio as the measured variable quench correlation parameter indicative of quenching) for, by way of example, a tritium isotope and illustrating also the contribution in the tritium counting window of a more energetic beta emitting isotope such as carbon-14;

FIG. 7 is a graphic representation similar to FIG. 6, but here depicting an arrangement wherein the contribution of the more energetic isotope in the tritium counting window is maintained constant at all quench levels of interest in accordance with the present invention;

FIGS. 8 – 11 are graphic representations respectively similar to FIGS. 4 – 7, but here illustrating an arrangement wherein the gain is preset to 100%;

FIGS. 12 and 13 are graphic representations respectively similar to FIGS. 4 and 5 and to FIGS. 8 and 9, but here depicting the spectra under 6.5% gain conditions so as to spread the pulse height spectrum for the more energetic isotope over the full discriminator analysis range;

FIG. 14 is a graphic representation similar to FIG. 6, here illustrating typical quench correlation curves for the more energetic carbon-14 isotope both prior to and subsequent to optimization of counting conditions in accordance with the present invention;

FIG. 15 is a graphic representation here illustrating a family of curves for a typical tritium isotope under eleven different quench conditions, the abscissa here being scaled in units of carbon-14 efficiency in the tritium window and the ordinate being scaled in units of tritium efficiency;

FIG. 16 is a block diagram of an exemplary data analysis system suitable for use in conjunction with the present invention, here illustrating particularly an arrangement for automatically optimizing the window settings in the isotope counting channels so as to insure optimum statistical validity;

FIG. 17 is a schematic wiring diagram, partly in block form, here illustrating details of the illustrative window selector shown in FIG. 16;

FIG. 18 is a block diagram similar to FIG. 16, but here illustrating a modified form of the invention wherein optimum counting conditions are attained by independently and automatically adjusting gain in the diverse counting channels;

FIG. 19 is a schematic wiring diagram similar to FIG. 17, but here illustrating details of the illustrative variable gain control shown in FIG. 18; and FIG. 20 is a graphic representation in which the abscissa is scaled in units of net external standard ratio and the ordinate is scaled in units of normalized gain, here depicting the increments of gain adjustment required under diverse quenching conditions in order to optimize counting conditions in accordance with the form of the invention shown in FIGS. 18 and 19.

While the present invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

Before discussing the present invention in detail, it may be helpful to first briefly consider the prior art background or environment within which the present invention finds especially advantageous application. In radioactivity measurements, it is the ultimate objective of most technicians to determine the activity level of isotopes which may be either singly present or present in multiple combinations within test samples, such activity level being expressed generally in units of disintegrations per unit time, e.g., disintegrations per minute (dpm). Thus, the quantity of a particular isotope present in a test sample is, in general, proportional to the rate of disintegrations produced by that isotope, such rate being termed the "activity level" of the source. As a generalization, the disintegrations or radiation emanations from a radioactive source are, for purposes of measurement or counting, converted into light scintillations which are generally proportional in photon energy to the energy of the disintegration which caused them. The light scintillations are then generally converted into corresponding voltage or current pulses, which are generally proportional to both the light scintillation and the disintegration which caused the particular pulse. Such pulses are then discriminated on the basis of their amplitude, and then counted. The pulses may be counted for a predetermined time (termed "present time" operation) or, alternatively, a predetermined number of pulses can be counted and the time required to reach such predetermined count measured (termed "preset count" operation). Generally, the ratio of counted pulses to the elapsed time period is indicative of the activity level of the sample.

a. General Organization and Operation Of An Exemplary Sample Processing Apparatus Referring now to FIGS. 1 and 2 conjointly, there has been illustrated an exemplary automatic sample processing apparatus, generally indicated at 20, which is intended to transfer a plurality of samples one at a time in seriatim order to and from a detection station. To this end, the exemplary apparatus 20 includes an elevator and detector mechanism, generally indicated at 21, which is positioned beneath a support table 22 (FIG. 1) on which one or more sample vials 24 are positioned both prior to and subsequent to transfer to a counting or detection station. As the ensuing description proceeds, those skilled in the art will appreciate that the particular means employed for conveying samples 24 to and from a point of alinement with the elevator mechanism 21 is immaterial to the present invention. Thus, it will be understood that the samples 24 may be carried in rotatable trays in the manner described in greater detail in both the aforesaid Packard U.S. Pat. No. 3,188,468 and Packard et al. U.S. Pat. No. 3,257,561, issued June 21, 1966 and assigned to the assignee of the present invention. Alternatively, a plurality of successive sample vials may be conveyed to a point of alinement with the elevator mechanism 21 by means of an endless conveyor having separate supports for the various vials. And, of course, it will be understood that successive sample vials may be manually placed on and removed from elevator apparatus 21. Moreover, while there has herein been illustrated and will be described a power driven elevator mechanism 21 for conveying successive samples 24 into and out of a detection chamber, the elevator need not be automatic and could take the form of a manually operated elevator of the type illustrated in one of the forms of the invention disclosed and claimed in Robert E. Olson U.S. Pat. No. 3,198,948, issued Aug. 3, 1965 and assigned to the assignee of the present invention. Indeed, the present invention will also find advantageous use in more rudimentary forms of radiation detection devices which are completely manual in operation and which do not employ any type of elevator, the samples being manually positioned within and removed from the detection chamber.

However, to facilitate an understanding of the present invention, the general organization and operation of the elevator and detector mechanism 21 will be briefly described hereinbelow. Those interested in a more complete operational and structural description of the mechanism 21 are referred to the aforesaid Packard and Olson patents.

Referring to FIG. 1, it will be noted that the elevator and detector mechanism 21 includes a base assembly 25 which houses a pair of light transducers, for example, photomultipliers PMT #1 and PMT #2 disposed on opposite sides of a vertical elevator shaft 26. Mounted within the elevator shaft 26 is an elevator 28 having a platform 29 at its upper end for supporting one of the radioactive test samples 24 and transporting the sample downwardly into the elevator shaft where it is alined between the photomultipliers PMT #1 and PMT #2. Each sample 24 may simply comprise a light transmissive vial or other suitable light transmissive container within which is placed a liquid scintillator and a radioactive isotope or isotopes to be measured. Thus, as the isotope or isotopes undergo disintegrations, light scintillations are produced in the light scintillator, and such scintillations are then detected by the photomultipliers which produce electrical output signals in the form of voltage or current pulses corresponding to each light scintillation detected. At the completion of the counting cycle the elevator 28 is returned upwardly so as to eject the sample 24 from the elevator and detector mechanism 21. A shutter mechanism 30 is mounted on the upper end of the base assembly 25 for the purpose of preventing erroneous output signals from the photomultipliers resulting from environmental light. At the same time, the base assembly 25 is formed of suitable shielding material such, for example, as lead, which serves to minimize the amount of environmental ionizing radiation causing light flashes in either the scintillation medium or the photomultipliers.

In order to insure that the shutter mechanism 30 is opened and closed in timed relationship with vertical movement of the elevator 28, the two devices are interconnected and actuated by a common reversible drive motor M1 (FIGS. 1 and 3a). While not illustrated in detail, the shutter mechanism 30 comprises a plurality of movable shutter blades which are interleaved with a plurality of fixed shutter blades, the latter having apertures therein alined with the elevator shaft 26 and with an aperture 31 formed in the tablelike support 22. The arrangement is such that when the movable blades are pivoted about a pivot point (not shown), they swing between limit positions to selectively open and close the upper end of the elevator shaft 26.

To effect such pivotal blade movement, the movable shutter blades are rigidly secured to a stub shaft (not shown) in a manner more fully described in the aforesaid Olson patent. Suffice it to say that the stub shaft is rigidly secured to the upper end of a generally flat, depending shutter actuating shaft 32 (FIG. 2) having a twisted portion 34 intermediate its ends. The lower end of the actuating shaft 32 is received within a tubular drive shaft 35 (FIG. 2), the latter being coupled adjacent its lower end to the elevator 28 by means of a bracket 36. A pair of dowel pins (not shown) or similar cam means extend transversely through the tubular drive shaft 35 in closely spaced surrounding relation to the shutter actuating shaft 32.

The arrangement is such that as the drive shaft 35 starts to move vertically upward, force is transmitted through the bracket 36 and the elevator 28, thus driving the latter upwardly to unload the sample 24. Just prior to the time that the sample 24 reaches the shutter mechanism 30, the dowel pins or similar cam means traverse the twisted portion 34 of the shutter actuating shaft 32, rotating the latter about its own vertical axis and pivoting the movable blades of the shutter mechanism out of the path of vertical movement of the elevator 28. During a sample loading cycle, the dowel pins or similar cam means serve to cam the shutter actuating shaft 32 in the opposite direction immediately after the new sample 24 passes through the alined apertures in the shutter mechanism and the table, thus swinging the movable blades to the closed position shown in FIG. 1.

To effect vertical movement of the drive shaft 35 and the elevator 28 for the purpose of introducing samples 24 into and ejecting such samples out of the elevator shaft 26, the drive shaft 35 is drivingly coupled to a conventional reversible motor M1 (FIGS. 1 and 3a). The particular means employed for coupling the motor to the drive shaft may vary and have not been illustrated or described in detail. Those interested in a more complete description of one exemplary drive system are referred to the aforesaid Packard and Olson patents. It should suffice to state for the purpose of an understanding of the present invention that the motor M1 is coupled to the drive shaft 35 in the exemplary apparatus by means of cables diagrammatically indicated at 38 in FIG. 3a. The arrangement is such that when the motor M1 is driven in one direction, the cables 38 are paid in and out so as to raise the elevator mechanism 21. Conversely, when the motor is driven in the opposite direction, the cables are paid in and out in the opposite direction, thus lowering the elevator mechanism 21.

The energizing circuit for the motor M1 includes a lower limit switch LS1 (FIGS. 2 and 3a) which is mounted on the frame of the sample handling apparatus 20 in a position to have its actuator LS1$_a$ depressed by a laterally projecting flange 39 mounted on the lower end of the elevator when the latter is in a down position with the sample 24 carried thereon alined between the photomultipliers PMT # 1, PMT # 2. Depression of the actuator LS1$_a$ serves to deenergize the motor M1 and the apparatus is then ready for a counting cycle. A second limit switch LS2, included in a second energizing circuit for the motor M1, is mounted on the frame of the apparatus 20 in position to have its actuator LS2$_a$ depressed by the flange 39 when the elevator arrives at its uppermost limit position with the sample 24 carried thereon having been ejected from the elevator shaft 26. Thus, the limit switch LS2 serves to deenergize the motor M1 when the elevator reaches its uppermost limit position.

Referring now to FIGS. 1, 2, 3a and 3b conjointly, a brief description of a typical "sample unload" and "sample load" cycle of operation will be set forth. Assuming that the exemplary elevator mechanism 28 is in its down position and that the sample vial 24 positioned in the detection chamber has undergone a complete counting operation for determining the activity level of the radioactive source therein, the technician is now ready to remove the particular sample 24 from the detection chamber between the photomultipliers PMT # 1, PMT # 2 and to substitute therefor a new sample 24. Considering for the moment, a semi-automatic operating cycle, it is merely necessary for the technician to press the UNLOAD button on the master control panel (not shown). When this is done, an energizing circuit will be completed from the terminal L2 (FIG. 3a) of a suitable a-c source (not shown) through any suitable circuit (not shown) in the Mode Program Control 40, and from thence through the "Change Sample" terminal 41, the normally closed "RUN" contacts of the upper limit switch LS2, and through the "UNLOAD" terminal of the elevator motor M1, the latter being coupled to the terminal L1 of the a-c source. Under these conditions, the motor M1 will be energized and will start to rotate so as to raise the drive shaft 35 and the elevator 28. As the elevator 28 starts upwardly, the flange 39 which is integral with the bracket 36 will release the actuator LS1$_a$ of the lower limit switch LS1, thus permitting the latter to return to its normal condition with the RUN contacts closed and the STOP contacts open. As the elevator 28 approaches its upper limit position (the shutter mechanism 30 having been opened by coaction of the shutter actuating shaft 32 and the drive shaft 35), the flange 39 engages the actuator LS2$_a$ of the upper limit switch LS2, thus shifting the latter to open its normally closed RUN contacts and close its normally open STOP contacts. When this occurs, the elevator motor M1 is deenergized and the sample vial 24 is in the "sample ejected" position.

During a semi-automatic operating cycle, the technician simply replaces the ejected sample vial with a new sample vial and then depresses the LOAD mode selector switch on the master control panel (not shown). On the other hand, in a completely automatic cycle of operation, closure of the STOP contacts of the upper limit switch LS2 could, through suitable circuitry not shown but described in greater detail in the aforesaid Packard et al. U.S. Pat. No. 3,257,561, cause energization of the indexing mechanism for automatically moving the next sample into place. In either case, when the new sample is in place an energizing circuit is completed from the terminal L2 of the a-c source through the Mode Program Control 40, its "Sample Changed" terminal 42, the normally closed RUN contacts of the lower limit switch LS1, and then through the LOAD terminal of the elevator motor back to the a-c terminal L1. The motor now runs in the opposite direction to again return the elevator 28 to its lowermost position. At the same time, the shutter mechanism 30 is closed as the drive shaft 35 moves downwardly and the cam means therein traverses the twisted portion 34 of the shutter actuating shaft 32. When the elevator 28 reaches its lowermost limit position, the cam actuator or flange 39 again engages and depresses the actuator LS1$_a$ of the lower limit switch LS1, thus breaking the RUN contacts and making the STOP contacts thereof. The motor M1 is again deenergized and the apparatus is now ready for another count cycle. Closure of the STOP contacts of the lower limit switch LS1 is effective to create a control signal from the terminal L1 of the a-c source to the "Elevator Down" terminal 43 of the Mode Program Control 40, thus signaling the latter that the apparatus is in condition for automatic initiation of the next counting cycle.

b. Automatic External Standardization

As stated above, the aforesaid Packard Pat. No. 3,188,468 discloses and claims various forms of procedures and apparatus for automatically subjecting successive samples to two separate counting cycles, during one of which the sample to be counted is exposed to a known quantity per unit time of radiant energy emanating from either an internal or an external standard. Generally stated, external standardization techniques are based upon a phenomenon known as "Compton Scatter," a phenomenon wherein the interactions that occur between penetrating radiation and electrons that comprise part of the test sample, produce electrons in the liquid scintillator having an energy spectrum similar in shape to that produced by a beta emitter. The "Compton Scatter" phenomenon is well known and need not be described in detail. Those interested in such a detailed description are referred to the aforesaid copending Cavanaugh application Ser. No. 541,721. Briefly, however, and with reference to FIG. 2, it will be observed that a standard source of penetrating radiation, here a compound source generally indicated at 44, has been illustrated at a position located exterior of and in proximity to the test sample 24 disposed in the detection chamber. As is characteristic of gamma emitters, or emitters of similar penetrating radiations, the source 44 will undergo a plurality of disintegrations in a given period of time, such disintegrations resulting in the emission of gamma rays in diverse directions. Certain of such gamma radiations will be directed towards, into or through the sample vial 24 disposed in the detection chamber, thus resulting in interactions between the gamma radiation and matter within the liquid sample, thereby causing excitation of electrons and producing a light flash therein. Under some circumstances, the energy of the gamma radiation may be totally absorbed, although more often the energy of the impinging gamma radiation is only partially absorbed. In the latter event, a photon will veer off randomly, in accordance with the principle of conservation of momentum, at a reduced energy until a second "Compton interaction" occurs. Since the photon is at a reduced energy, the changes of producing a second "Compton interaction" are increased. If and when the photon interacts with matter within the sample vial a second time, the energy of such photon will again be either totally or partially absorbed, thus producing electrons and creating a second light scintillation in the vial 24. The net result of the foregoing is that "Compton interactions" occurring in the sample 24 will produce an energy spectrum which is highly related by physical laws to that produced by a beta emitter. Consequently, if the isotope disposed in the sample 24 happens to have an energy spectrum that is highly related by physical laws to the energy spectrum produced by the "Compton interactions," then it is possible to determine the true activity level of the isotope regardless of the degree of quenching, changes in line voltage, or instrument drift, since the effect of these variables would be the same on both the isotope and the standard. This has conventionally been done by either arithmetical computations or by comparison with previously prepared sets of calibration curves.

As shown in FIG. 2, there has been illustrated an exemplary apparatus for pneumatically shifting the compound external standard radioactive source material 44 into and away from proximity to the sample vial 24 disposed in the detection chamber. Those interested in the specific details of this system are referred to the aforesaid Cavanaugh application Ser. No. 541,721. However, in order to facilitate an understanding of the present invention, this prior automatic standard positioning system will be briefly described below.

Referring to FIG. 2, it will be observed that the standard radioactive source material 44 is positioned within a generally vertically extending conduit 45 which terminates at its upper end adjacent the detection chamber within which the sample vial 24 is positioned. The upper end of the conduit 45 terminates in a fixed stop 46 and is coupled to atmospheric pressure through a suitable transverse conduit 48. The lower end of the conduit 45 projects into a shielded housing 49 which is rigidly secured to the frame of the apparatus 20, there being an annular stop 50 formed in the lower end of the conduit 45 within the housing 49. As here shown, the lower end of the conduit 45 is coupled directly to a pair of control valves 51, 52, the valves being respectively coupled to the pressure and vacuum sides of a conventional fluid pump which may simply take the form of a pneumatic pump P. In the illustrative apparatus, the pressure valve 51 is controlled by means of a solenoid S1 having terminals T1, T2, while the control valve 52 is actuated by means of a solenoid S3 having terminals T3, T4.

The arrangement is such that when the solenoid S1 is energized, the conduit 45 is coupled directly to the high pressure side of the pump P through the valve 51. Under these conditions, the compound standard source 44, which is confined within the conduit 45, is blown or urged upwardly within the conduit 45 until it engages the fixed stop 46 at the upper end of the conduit. Preferably, the solenoid S1 is only energized momentarily to provide a pulse of fluid pressure and, therefore, provision is made for magnetically holding the compound source material 44 in the position shown in FIG. 2 adjacent the sample vial 24. To this end, a steel ball 54 or other suitable magnetically attractable material is disposed within the conduit 45 immediately beneath the compound source 44. An annular torroidal magnet 55 is disposed near the upper end of the conduit 45 in surrounding relation thereto, the magnet being positioned generally at or near the upper edge of the elevator platform 29. Thus, when the solenoid S1 is deenergized, the source material 44 and the steel ball 54 will tend to fall downwardly through the conduit 45 until the steel ball is magnetically attracted by the magnet 55, thus precisely positioning the compound source material. When the technician wishes to remove the compound source material, it is merely necessary to momentarily energize the solenoid S2, thus coupling the conduit 45 directly to the vacuum or low pressure side of the pump P through the control valve 52. when this occurs, a vacuum is drawn in the conduit 45 and such vacuum, together with atmospheric pressure exerted through conduit 48, serves to drive the compound source material 44 and the steel ball 54 downwardly through the conduit until the train engages the annular fixed stop 50 within the shielded housing 49.

Turning now to FIGS. 3a and 3b there will be described typical operating cycles for both the Automatic Standardization OFF and ON modes. Thus, assuming first that technician desires merely to count a particular sample without subjecting the sample to external radiation, it is merely necessary to condition the automatic standardization control switch 56 (FIG. 3a) in the OFF position. Under these conditions, when the elevator 28 reaches the down position and a signal is imposed upon the "Elevator Down" terminal 43, such signal is effective through suitable circuitry in the Mode Program Control 40 to immediately create a control signal at the "Start Count" terminal 58, thereby initiating a counting cycle in a manner to be described in greater detail below. Upon completion of the counting cycle, a control signal will appear at the "Count Complete" terminal 59 for the Mode Program Control 40, which signal will be transmitted directly to the "Start Print" terminal 60 for the purpose of commencing a print cycle for the display portion of the apparatus. Upon completion of the print cycle, a control signal appears at the "End Print" terminal 61 which is transmitted directly to the "Change Sample" terminal 41 for purposes of energizing the elevator motor M1 through its UNLOAD terminal in the manner previously described so as to eject the test sample 24 from the detection chamber.

Assuming next that the technician wished to count a sample in an Automatic Standardization operating mode, it is merely necessary that the control switch 56 be conditioned in the ON condition. When this occurs, and the elevator 28 reaches its lowermost position with the new sample, the signal presented on the "Elevator Down" terminal 43 is conveyed through a differentiating device (not shown) to the "Insert Source" terminal 64 of the Mode Program Control. The signal pulse which is presented at the terminal 64 is applied directly to the Source In/Out Control logic 65 to complete an energizing circuit for the solenoid S1 through circuitry (not shown) more fully described in the aforesaid applications of Packard, Ser. No. 630,892 and Cavanaugh, Ser. No. 630,891. At the same time that the control signal is applied to the "Insert Source" terminal 64, it is also conveyed to the "Start Count" terminal 58 of the Mode Program Control 40 through a conventional time delay device (not shown) which provides a sufficient delay to insure that the compound source material has shifted from its shield position in housing 49 to its effective position adjacent the sample 24. The control signal presented at the "Start Count" terminal 58 is effective to initiate a first counting cycle for the sample 24 while the external standard source material 44 is in proximate relation to the vial 24. Upon completion of the counting cycle, a signal is presented at the "Count Complete" terminal 59 of the Mode Program Control 40, which signal is passed through the ON contacts (not shown) of the automatic standardization control switch 56 to the "Retract Source" terminal 70 of the Mode Program Control 40 through any suitable differentiating device (not shown). The signal presented at the terminal 70 completes an energizing circuit through the Source In/OUt Control Logic 65 for the solenoid S2 and the pump P, thus energizing the latter and shifting the control valve 52 to a position where the conduit 45 is coupled directly to the vacuum side of the pump, thereby drawing the compound source material 44 from its position adjacent the sample vial 24 in the detection chamber back into its shielded position in the housing 49. At the same time that the control signal is presented on the "Retract Source" terminal 70, it is also conveyed to the "Start Count" terminal 58 of the Mode Program Control 40 through a conventional time delay device (not shown) to insure that the compound source has been retracted. The signal presented at the "Start Count" terminal 58 of the Mode Program Control 40 is then effective to initiate a second counting cycle for the sample 24, this time with the external standard source removed. At the completion of the second counting cycle, a control signal is presented at the "Count Complete" terminal 59 and passed directly through the ON switch contacts (not shown) for the automatic standardization control switch 56 through a differentiating device (not shown) and is applied as a control pulse at the "Start Print" terminal 60, thus again initiating a display cycle identical to that previously described, at the end of which a control signal is presented at the "Change Sample" terminal 41 which is effective to complete an energizing circuit for the elevator Motor M1 through its UNLOAD terminal, thereby ejecting the sample vial 24 from the detection chamber after it has undergone two successive counting cycles, one which the external standard source material 44 in proximity to the vial and one in which the external standard source material 44 is remote from the vial and within the shielded housing 49.

c. Programming Logic

Since procedures and equipment embodying the features of the present invention will normally be used with an associated programming control circuit, a typical programming system, generally indicated at 75 (FIG. 3a), will be briefly described hereinbelow. To this end, it will be observed that after a sample 24 has been properly positioned between the detector photomultipliers PMT # 1, PMT # 2, a signal is presented on the "Start Count" terminal 58 in the manner previously described indicating that the new sample 24 is loaded and that the next counting cycle should be started. The control signal presented at the terminal 58 is then passed over a line 76 to the START terminals of a timer 78 and a start-stop control 79. At the same time, a control signal is passed from the Mode Program Control 40 through a "Select Time" terminal 80 directly to the timer 78, which signal serves to reset the timer to its zero time condition while at the same time selecting the increment of time for the timer 78 to operate during the ensuing counting cycle. The signal passed through the start-stop control 79 from the "Start Count" terminal 58 provides one of two control input signals which are necessary to open gates 81a, 81b, 81c, 81d and 81e, such gates being respectively associated with five pulse height analyzing channels. During the predetermined time interval measured off by the timer 78, voltage or current pulses produced by the photomultipliers PMT # 1, PMT # 2, are simultaneously passed to a coincidence logic 82 and a summing amplifier 84. If pulses are simultaneously sensed from both photomultipliers by the coincidence logic 82, an output signal is passed from the coincidence logic 82 directly to the gates 81a–81e, thus providing the second control input signal necessary to open the gates. It should be noted at this point that the gates 81a–81e are of the type which are normally closed to prevent the passage of pulses therethrough and which are opened only by virtue of the simultaneous presence of control input signals from the coincidence network 82 and the start-stop control 79.

The pulses from the photomultipliers PMT # 1, PMT # 2 which are passed to the summing amplifier 84 are algebraically added to provide a single output pulse representative of the sum of two input pulses, which single output pulse is simultaneously presented to the input terminals of variable gain controls 85a–85e which are respectively associated with the five pulse height analyzing channels. The output signals from the variable gain controls 85a–85e are, in turn, respectively passed to the input terminals of five pulse height analyzers 86a–86e. Those skilled in the art will appreciate that the pulse height analyzers 86a–86e comprise suitable discriminator circuits (not shown in FIG. 3a) which may selectively adjusted to permit passage of only a selected amplitude band of pulses therethrough. Moreover, the input pulses to the five pulse height analyzing channels may be differentially amplified by means of the variable gain controls 85a–85e in a manner described in greater detail in Lyle E. Packard U.S. Pat. No. 3,114,835, issued Dec. 17, 1963 and assigned to the assignee of the present invention. Thus, those pulses in each of the five pulse height analyzing channels which exceed in amplitude the base discriminator level for the respective analyzers 86a–86e but do not exceed the maximum discriminator level are passed from the pulse height analyzers to the input of the gates 81a–81e. Assuming that coincident signals have been detected by the coincidence network 82, such pulses are passed through the now open gates directly to the inputs of respective scalers 88a–88e or other suitable counting devices. In a completely automatic system of the type to be described herein, the scalers 88a–88e respectively provide output signals S1-S5 which are passed to the data processing portion of the system, indicated generally at 87 in FIG. 3b.

At the end of the timed period provided by the timer 78, the latter supplies a signal over lines 89 and 90 to respectively indicate to the Mode Program Control 40 that the count has been completed and to cause the start-stop control 79 to close the gates 81a–81e. Thus, referring to FIG. 3a it will be observed that the line 90 which is coupled to the timer is coupled directly to the "Count Complete" terminal 59 for the Mode Program Control 40. At this time, the timer 78 provides a timing signal T1 indicative of the length of the time period and a "Count Complete" signal which are also conveyed to the data processing system to be subsequently described in the same manner as the output signals S1-S5 from the scalers 88a–88e. Finally, at the time that the timer 78 times out and provides a "Stop" signal for the start-stop control 79, the latter, after a sufficient delay to insure that the data recorded in the scalers 88a–88e has been read out by the data processing portion of the system, provides a reset signal for the scalers over line 91, which signal is effective to reset all of the scalers to their zero state.

Because the system shown diagrammatically in FIG. 3a may take any of a variety of forms known to those skilled in the art, it need not be illustrated or described in greater detail. It will, however, be understood that the "counts" recorded by the scalers 88a–88e and provided to the data processing portion of the system as signals S1-S5 will include responses to background radiation which produces scintillation flashes in the liquid scintillator and which is received from extraneous sources, such background responses being in addition to the responses to radiation from the sample being measured. However, this "background count" can be first measured with no sample, or a sample of known radioactive strength in the detector. Such background count would, of course, include any negligible counts that are created by the external standard source 44 when the latter is in its shielded housing 49. The background count can then be subtracted from each sample reading to arrive at an indication of the sample's radioactive strength. To accomplish this, the apparatus is provided with three sets of four thumb-wheel type dial-in switches which are located on the master control panel (not shown). Thus, after the technician has determined what the background count is for each of the three data channels — viz., the channels including scalers 88c, 88d, 88e — he need only dial such readings into the system and they will thereafter provide input signals BG1, BG2 and BG3 (FIG. 3b) for the data processing portion 87 of the system which can then be subtracted from gross counts to provide an indication of net counts per minute.

Besides counting the number of responses by the photomultipliers in a predetermined time interval (preset time operation), the time period required for the generation of a predetermined number of responses (preset count operation) may be measured and recorded, as is well known, in which event the Mode Program Control 40 would provide a suitable signal over the "Select Time" terminal 80 to cause the timer 78 to generate a "Stop" signal for the start-stop control 79 at the time that the preset count is reached.

d. Data Processing System

The particular data processing system employed in conjunction with the present invention is not critical, and any of numerous well known systems may be utilized. However, as the description of the present invention proceeds it will be appreciated by those skilled in the art that particularly advantageous results will be achieved where the data processing system is characterized by its ability to analyze data fed to it from, for example, the scalers 88a and 88b, which data may be representative of a particular external standard ratio — viz., a ratio of the counts accumulated in the two different scalers which have been contributed by the external source 44 (FIGS. 2 and 3a). Such data may then be utilized to automatically simulate a controlled quench level which is superimposed on the measured actual quench level for each sample to establish one of $m$ (where $m$ is any whole integer) effective quench levels, for each of which counting efficiencies for the isotopes of interest are accurately known. Such systems are described in detail in the aforesaid applications of Packard, Ser. No. 630,892, and Cavanaugh, Ser. No. 630,891.

However, in order to facilitate an understanding of the invention, there shall be briefly described hereinbelow, in conjunction with FIG. 3b, a typical one of such systems. Those interested in the specific details thereof are referred to the aforesaid Cavanaugh application, Ser. No. 630,891, for a description of a system wherein simulated quenching is created by controllably modulating the quantum efficiency of the photomultipliers PMT # 1, PMT # 2, or the collection efficiencies of the first dynodes thereof in response to measurement of a quench indicating parameter such as net external standard ratio, and to the aforesaid Packard application, Ser. No. 630,892 for a description of a similar system wherein simulated quenching is effected by controllably modulating the light energy produced prior to impingement with a light transducer in response to measurement of such a parameter.

Referring now to FIG. 3b, it will be observed that the output signals S1-S5 from the scalers 88a–88e respectively (FIG. 3a) are here fed as input signals to a Computer/Analyzer Logic 92 which forms part of the data processing system generally indicated at 87. Considering for the moment the signals S1 and S2 produced by the scalers 88a and 88b, it will be recalled that such signals are, in the exemplary system, representative of counts produced in two different windows by interactions between radiations emanating from the external standard source 44 (FIGS. 2 and 3a) and the scintillator material in a test sample 24. Therefore the ratio of the counts accumulated in the two scalers 88a, 88b, is the gross external standard ratio which may be utilized to provide an indication of quenching.

Assuming that two successive counting cycles are conducted, one with the source 44 adjacent a sample 24, and one with the source remote from the sample and in the shielded housing 49, it will be appreciated that two successive S1 and S2 signals will be presented as input signals to the Computer/Analyzer Logic 92. As explained in greater detail in the aforesaid Packard and Cavanaugh applications, Ser. Nos. 630,892 and 630,891, the first set of signals S1, S2 may be stored, and the second set of signals S1, S2 (derived when the source 44 is remote from the sample 24) may then be subtracted from the first set to provide an indication of net external standard counts in the two channels. The net counts in the channel containing scaler 88d are then divided into the net counts accumulated in the channel containing scaler 88e to provide an indication of net external standard ratio.

Such ratio can then be displayed in an "Answer Register" 94 which forms part of the Computer/Analyzer Logic 92. Preferably the equipment is so adjusted that the computed ratio is multiplied by a constant so as to arbitrarily establish a ratio of 1.0 for an unquenched standard. Therefore, with progressively increased quenching the gross counts accumulated in the scalers 88a, 88b will be degraded, resulting in a change in the computed ratio from 1.0 to 0.0, dependent upon the degree of quench. The particular program instructions for causing the Logic 92 to operate in the foregoing sequential manner are delivered to the logic from the Mode Program Control 40 (FIG. 3a) over line 95.

Let it now be assumed that the answer appearing in the Answer Register 94 is the five digit number 0.3621 where the $a$ digit is 0, the $b$ digit is 3, the $c$ digit is 6, etc. Under such an assumption it can be seen that the net external standard ratio for that particular sample will be 0.3621 indicative of a severely quenched sample when contrasted with the preset arbitrary ratio of 1.0000 for an unquenched standard.

As will be described below, the technician may know counting efficiencies for the particular isotope involved with a high degree of accuracy only for certain selected quench conditions—say, for example, only for ratios of 1.0, 0.9, 0.8, . . . 0.0, but not for intermediate quench levels. Thus, in the practice of the inventions disclosed in, for example, the aforesaid Cavanaugh application, Ser. No. 630,891, provision is made for simulating a quench condition for the test sample 24 so as to create an effective quench level equal to one of the selected levels for which counting efficiency is known with a high degree of accuracy — e.g., here a level corresponding to a ratio of 0.3000. To accomplish this, and as described in more detail in the aforesaid Cavanaugh application, Ser. No. 630,891, the binary coded decimal information stored in the $c$, $d$, and $e$ digits of the Answer Register 94 is passed to a Simulated Quench Control 96 where the date is decoded and the resultant digital information is converted into increments of, for example, current. Such incremental current values are then transmitted over line 98 to the photomultipliers PMT # 1, PMT # 2, where they serve to simulate a controlled quench condition by altering the quantum efficiency of the photomultipliers. The circuitry (not shown here in detail) is selected such that the amount of simulated quench is a function of the difference between the measured ratio — here 0.3621 — and the selected ratio to which the system is to converge — here 0.3000. The foregoing cycle may then be repeated as many times as desired to insure convergence to, or reasonably close to, the desired effective quench level.

To provide for further control, the binary coded decimal information stored in the $a$ and $b$ digits of the Answer Register 94 is preferably decoded in a suitable decoder device 99 (FIG. 3b) which provides suitable output signals at a selected one of its terminals, $b.9$, $b.8$, $b.7$, . . . $b.0$ digitally indicative of the value of the $a$ and $b$ digits — here 0.3. Such digital information may then be transmitted to the Simulated Quench Control 96 to modulate the incremental current signal created therein the manner described in the aforesaid Cavanaugh application, Ser. No. 630,891.

In the arrangement described in Packard application, Ser. No. 630,892, a similr system is provided. However, in this instance the output signal from the Simulated Quench Control 96 is preferably a controlled potential level which may be used for energizing a servo motor driver (not shown here) for causing, for example, incremental movement of the photomultipliers PMT # 1 and PMT # 2 towards or away from the sample 24 undergoing analysis so as to controllably alter the quantum of light energy reaching the photomultipliers. Again, the net effect is to simulate a quench condition which is algebraically added to the actual sample quench level to produce a preselected desired effective quench level for which counting efficiencies are accurately known.

Preferably, and in accordance with the disclosures in the aforesaid applications of Packard, Ser. No. 630,892, and Cavanaugh, Ser. No. 630,891, provision is also made in the exemplary data processing system 87 for enabling automatic computation of sample activity levels in terms of disintegrations per minute (dpm). To this end, and keeping in mind the fact that the technician will know with a high degree of accuracy the various isotope counting efficiencies in the different windows only for each of $m$ selected quench levels — e.g., levels corresponding to net external standard ratios of 0.9, 0.8, 0.7, . . . 0.0 — provision is made on the control panel (not shown) for the instrument for dialing into the system such known efficiency values. Thus, as shown in FIG. 3b, the Computer/Analyzer Logic also receives control inputs over lines 100, 101 and 102 which are representative of such known efficiencies.

Thus, when the technician elects to operate in a mode wherein the system is to analyze each sample and then automatically compute absolute activity levels for the sample, he need only condition the Automatic DPM Control switch 104 (FIG. 3a) in the ON state and, thereafter, the Mode Program Control 40 will function through the program instruction line 95 to cause the Computer/Analyzer Logic 92 to first compute the actual quench level of the sample, to then converge to a selected one of $m$ effective quench levels, for each of which counting efficiencies are accurately known, to then compute net counts per minute (cpm) for the diverse isotopes and, finally, to divide such net counts per minute by the proper dialed in efficiencies to produce absolute sample activity levels in units of disintegrations per minute (dpm). Such data may then be fed to a conventional print out device 105 for display in any suitable manner. In practice, the print out device 105 is preferably enabled only upon reception of a control signal from the "Start Print" terminal 60 (FIG. 3a) and, upon completion of a print cycle, it will then produce a control signal at the "Print Complete" terminal 61 so as to enable the Mode Program Control 40 to permit automatic continued cycling of the overall system.

e. Spectral Distributions and Factors Affecting Pulse Height Spectra

It is well known that beta emitting isotopes produce disintegrations which individually involve energies spread over a very wide range or spectrum. Each isotope has its own characteristic spectrum with a known maximum energy, such spectrum including a few disintegrations of near zero energy, a few disintegrations of maximum energy, and a majority of disintegrations having energies in the region between the upper and lower limits. Between these limits, the spectrum rises to a peak and then falls. Since the light transducers or photomultipliers PMT # 1, PMT # 2 produce pulses which are substantially proportional in amplitude to the energies of the corresponding disintegrations, the pulse height spectrum will, for a given gain of the photomultiplier, correspond to the energy spectrum of disintegrations. A characteristic pulse height spectrum for a typical low energy beta emitter such as tritium ($^3H$) in an unquenched sample is graphically represented by the spectral curve 106 shown in FIG. 4. A similar characteristic pulse height spectrum for a typical higher energy beta emitter such as carbon-14 ($^{14}C$) in an unquenched sample is graphically represented by the spectral curve 108 shown in FIG. 4. It will, of course, be understood that the area under the curves 106, 108 is representative of the total number of output pulses from the photomultipliers, and is, therefore, proportional to the total number of disintegrations occurring in the test sample in a given unit of time, say, one minute.

Considering, for the moment, the spectral curve 106 shown in FIG. 4 diagrammatically representative of the spectrum for tritium ($^3H$), it should be noted that such curve is here representative of the distribution of voltage or current pulse heights (either at the outputs of photomultiplier tubes or subsequently in the amplification circuits). Thus, for purposes of discussion the abscissa of the graph shown in FIG. 4 may be considered as volts as a measure of pulse height, while the ordinate is expressed in counts per unit time, or counts per minute (cpm). It will be understood by those skilled in the art that the values of pulse heights may also be expressed in terms of divisions of discriminator settings in the pulse height analyzers 86a-86e (FIG. 3a). Thus, assuming that system gain is set to produce maximum pulses on the order of (8v), and assuming further that the full range of discriminator settings is 1,000 divisions, it will be appreciated that each division of the discriminator will be equivalent to 0.008v. For an actual curve, the numerical values of pulse height would depend upon the gain settings of the photomultiplier and/or subsequent amplification stages (e.g., the amplifiers 84 and 85a-85e shown in FIG. 3a), while the counts per minute scale would depend upon the activity level of the sample.

Let it be assumed for the moment that a sample containing a tritium isotope is to be analyzed and the technician wishes to record pulses representative of decay events occurring in the sample in the channel including pulse height analyzer 86c and scaler 88c (FIG. 3a). In this event, the technician would adjust the two discriminators (not shown in FIG. 3a) which define the pulse height analyzer 86c to establish a base level A and a maximum level B (shown diagrammatically in FIG. 4) for the pulses that are to be counted. In other words, the technician would adjust the pulse height analyzer 86c so that any pulses which did not exceed level A in amplitude would be rejected, while any pulses which exceeded level B would also be rejected. Thus, the only pulses which would be counted would be those falling between the levels A and B and, thus, the AB discriminators define what is commonly referred to in the art as an "AB window". In order to operate the spectrometer at, or near, optimum counting conditions for an unquenched sample, it is necessary to adjust the pulse height analyzer 86c (FIG. 3a) so that counting efficiency in the channel including scaler 88c (i.e., the ratio of counts observed on the scaler 88c to the number of decay events occurring in the test sample 24) is high while the number of background counts are low — preferably the AB window should be adjusted so that the ratio $E^2/B$ (where E is counting efficiency and B is background noise) is maximized. To achieve this desirable objective the AB window (FIG. 4) of the pulse height analyzer 86c should be wide, but not so wide that the number of background pulses included in the window are great in comparison with the number of pulses resulting from decay events in the test sample. Moreover, in order that the counting efficiency be as high as possible for a given window width, the AB window should embrace the peak portion of the pulse height spectrum 106, or as nearly so as possible. At the same time, however, it is essential that the level A be at or somewhat above the threshold level T for the electronic components of the equipment while the level B discriminator must be at or below the saturation point level SP for such equipment.

As illustrated in FIG. 4, the exemplary AB window setting for the $^3H$ window at a gain of, for example, 53% and for an unquenched sample ranges from approximately 25 divisions to approximately 985 divisions.

Considering next FIGS. 4 and 12 conjointly, it will be observed that the above disucssion is also applicable to the setting of the equipment for the higher energy carbon-14 isotope ($^{14}C$) represented by the spectral curve 108. In this instance, however, since carbon-14 is considerably more energetic than is tritium, it is necessary to attenuate the pulse height scale in order to count with optimum efficiency. Thus, and assuming that the technician wishes to count the carbon isotope in the channel including pulse height analyzer 86d and scaler 88d (FIG. 3a), the technician would first adjust the variable gain control 85d so as to shift the carbon spectrum downwardly to the solid line position shown by curve 108' in FIG. 12. Comparing the curve 108' for carbon-14 in FIG. 12 with the curve 108 for carbon-14 in FIG. 4, it will be noted that when the pulse height analyzer 86c is adjusted for optimum counting of the tritium isotope in the AB window, it is virtually impossible to establish good counting conditions for the carbon isotope. The reason for this is simply that in order to separate the two pulses the CD window defined by the discriminators which form pulse height analyzer 86d must be set close together and close to the saturation point of the equipment. Otherwise, there will be a significant contribution of counts in the CD window by the lower energy tritium isotope. However, by adjusting the variable gain control 85d, it is possible to produce conditions similar to that diagrammatically represented in FIG. 12 where satisfactory counting conditions can be established in the CD window for carbon-14 and wherein counts contributed by the lower energy tritium isotope are substantially excluded. As here shown, the exemplary CD window setting for the $^{14}C$ window at a gain of, for example, 6.5% and for an unquenched sample ranges from approximately 106 divisions to approximately 1,000 divisions.

A real problem often encountered in liquid scintillation spectrometry results from the phenomenon generally known as "quenching", a phenomenon which causes the pulse height spectrum representative of a given isotope to vary from that which would normally be observed when no quenching occurs. When the test sample 24 is prepared, a solvent for the scintillation medium is selected which is transparent and which has maximum light transmitting characteristics. The vial which contains the sample is also carefully selected to insure that it will not impede the transmission of light photons to the photomultiplier. However, the substance containing the radioactive material to be assayed often has relatively poor light-transmitting characteristics. Merely by way of example, if the radioactive isotope is contained within a blood or urine sample, the test sample will be red or yellow in color rather than clear. Such red or yellow coloring of the test sample impedes the transmission of light from the scintillation flashes to the photomultipliers PMT #1, PMT #2 so that the latter do not detect the same number of light photons as they would otherwise have detected had the test sample 24 been colorless. Stated another way, the light produced in the scintillation medium by a given decay event is attenuated in its passage to the photomultipliers with a consequent attenuation of the output pulses from the photomultipliers. Moreover, since certain of the lower energy decay events produce only few light photons, the effect of light attenuation in the test sample will, in some instances, prevent a sufficient number of light photons from reaching the photosensitive cathode so that no detactable reponses in the photomultipliers PMT #1, PMT #2 are produced. The foregoing phenomenon is commonly referred to as "color quenching" and can be represented graphically as shown in FIG. 4 by the peak portions of spectral curves 106a, 106b and 106c which respectively represent progressively increased quench conditions for the unquenched tritium isotope represented by the curve 106. Thus, while the particular isotope being tested would, in the absence of quenching, produce a spectrum such as shown at 106, in the presence of such color quenching, the entire spectrum would shift downwardly (or to the left as shown at 106a in FIG. 4) because of light attenuation in the sample 24 and, as the degree of quenching is increased, the curve will progressively shift downward to positions represented by the illustrated portions of curves 106b or 106c. Such progressive increased quenching would also effect the spectrum 108 as indicated at 108a, b and c in FIG. 4.

There is still another source of quenching error which introduces problems into liquid scintillation spectrometry techniques. This latter source of error is commonly referred to as "chemical quenching", and results from the presence of certain substances in the test sample which, irrespective of color, interfere with the conversion of radiation energy into light energy. Such substances cause a portion of the radiation energy to be dissipated as heat rather than producing light photons in the scintillation medium. The presence of chemical quenching can in some instances involving relatively low energy decay events, prevent generation of a sufficient number of light photons to trigger the photomultiplier. It will be apparent, however, that chemical quenching will produce an effect similar to that produced by color quenching; i.e., the pulse height spectrum will be shifted to the left. And, of course, in certain instances the test sample may be subject to both chemical and color quenching, in which case the total effect is additive.

Referring to FIG. 12, there have been diagrammatically illustrated the peak portions of spectral curves 108a, 108b and 108c which are respectively representative of progressively increased quench conditions for the higher energy isotope carbon-14. As here illustrated, it will be observed that the effect of quenching with the higher energy isotope is quite similar to that for the lower energy isotope — viz., quenching causes the curve to shift downwardly to the left because of the attenuation of light pulses.

Referring now to FIG. 5, it will be readily appreciated that as quench is progressively increased, the ability to separate the pulses emanating from the two isotopes is significantly reduced and counting conditions are, therefore, degraded. Thus, there is here illustrated the same two spectral curves as are shown in FIG. 4 under unquenched conditions, as they would appear under severely quenched conditions — for example, at a net external standard ratio of 0.3000. As here shown, the curve 106 of FIG. 4 is shifted downwardly and to the left to the position indicated at 106Q, while the $^{14}$C curve has shifted from the position 108 (FIG. 4) to the position 108Q. Since quenching does not affect the discriminator settings, it will be observed that extremely poor counting conditions now exist in the AB window — that is, the area under the curve 106Q is substantially reduced because of relatively poor $^3$H counting efficiencies and, conversely, the area under curve 108Q is substantially increased because of greater $^{14}$C counting efficiencies in the tritium AB window. A similar situation occurs in the carbon-14 ($^{14}$C) CD counting window as shown in FIG. 13. In this case, however, the tritium spectrum has shifted from the position 106' (FIG. 12) entirely out of the CD window to the position shown at 106'Q, while the carbon-14 spectrum has shifted downwardly and to the left from the position 108' (FIG. 12) to the position 108'Q — i.e., the area under the curve 108'Q within the CD window is significantly reduced. At the same time, background noise (not shown but prevalent particularly in the upper regions of the CD window) remains substantially unchanged. Consequently, the ratio E/B in the carbon-14 CD window is significantly degraded because of quenching.

f. Quantitative Determination of Quenching and True Sample Activity Levels by External Standardization Techniques Those skilled in the art will appreciate that external standardization techniques are well known for their ability to provide a quantitative indication of the degree of quenching. Such techniques are described in detail in the aforesaid Packard U.S. Pat. No. 3,188,468, Cavanaugh application Ser. No. 541,721 and Bristol appliction Ser. No. 629,462. Consequently, it should not be necessary to describe this system in detail. Suffice it to say that the output pulses from the summing amplifier 84 (FIG. 3a) which are passed to the channels respectively containing the scalers 88a and 88b are adjusted in gain and discriminated so as to produce counts in the scalers 88a and 88b which are primarily representative of disintegrations occurring in the external standard source. For example, as thoroughly described in the aforesaid Bristol application, the pulse height analyzer 86a could have its base discriminator define the lower level of a G-to-infinity window (not shown) while the pulse height analyzer 86b could have its base level set to define an H-to-infinity window (not shown) where the level H is greater than the level G. In other words, in the G-to-infinity window all pulses which exceed in amplitude the G level would be counted in the scaler 88a, whereas only those pulses which exceed a higher amplitude level H would be counted in the scaler 88b. For practical purposes, it is preferable that the G-to-infinity and H-to-infinity windows be so adjusted that approximately two times as many counts will be recorded in the scaler 88a as in the scaler 88b when dealing with an external standard and an unquenched sample. Again, however, when quench occurs the spectral curve (not shown) for the external standard will shift downwardly and to the left in precisely the same manner as the spectral curves 106, 108 shown in FIGS. 4 and 12. As a consequence of quenching, therefore, there will be fewer counts recorded in the G-to-infinity and H-to-infinity windows, thus changing the ratio of counts in the two windows. Since the ratio of counts received by each of the two infinity channels will no longer be the same, it provides a versatile procedure for quantitatively determining the amount of quenching.

Referring next to FIG. 6, there has been illustrated a conventional quench correlation curve 109 for determining counting efficiencies for a typical beta emitting isotope, here, for a $^3$H isotope at a gain of 53% in the AB window. In this case, since the quench correlation curve 109 is for tritium ($^3$H), the ordinate is scaled in units of percentage of counting efficiency for the tritium window while the abscissa is scaled in units of a measurable quench correlation parameter, in this case, net external standard ratio (viz., the ratio of counts recorded in the G-to-infinity and H-to-infinity windows). There has also been illustrated a second curve 110 which is here representative of the carbon-14 ($^{14}$C) contribution in the tritium AB window.

In order to prepare a calibration curve such as is depicted at 109 in FIG. 6, the technician has heretofore normally prepared a series of samples of known activity for each different isotope that may be of interest. In the exemplary case, where the isotope of interest is tritium, the technician might, for example, prepare a series of 11 samples each of which includes the same amount of tritium activity (e.g., each of the eleven samples might include 100,000 dpm of tritium activity). The technician will next add to each of the samples precisely the same amount of liquid scintillator medium, for example, 15.75 ml of liquid scintillator medium per sample vial. The technician then adds varying quantities of suitable quench material to different ones of the eleven samples. For example, the first sample in the series of eleven will usually be the unquenched sample and, consequently, no quench material is added to that sample. The second sample in the series will have a small amount of quench material added — perhaps on the order of approximately 15 microliters of quench material. The third sample will have a greater quantity of quench material such, for example, as approximately 30 microliters, while each succeeding sample in the series will have successively greater quantities of quench material inserted therein. The net result of this advance preparation is the formation of a series of 11 differently quenched samples each of which has approximately the same volume and each of which possesses the same activity.

Once the series of differently quenched samples has been prepared in the manner described above, the technician will then successively insert each sample in the series into the apparatus 20 (FIGS. 1 and 2) where the activity level of the sample is measured. Referring next to FIG. 3a, let it be assumed that the apparatus there depicted has been adjusted so as to permit counting of the isotope undergoing test (here tritium) in the channel containing scaler 88c while the channels containing scalers 88a and 88b are preset so as to permit counting of an external standard (i.e., emissions emanating from the standard source material 44 shown in FIG. 2).

With the apparatus 20 and programming logic 75 (FIG. 3a) adjusted in the foregoing manner, the technician may first insert the unquenched sample into the detection chamber of the apparatus and initiate a counting cycle for a predetermined time interval — say, one minute. During that one minute period, the standard source material 44 is shifted into proximity with the sample vial then disposed in the detection chamber, for example, by means of the apparatus shown in FIGS. 2 and 3a as previously described. During the course of this first one-minute counting cycle, counts will be recorded in the scalers 88a and 88b which can readily be converted into a count ratio for the two channels, which ratio is arbitrarily set at 1.0 for an unquenched sample as previously described. Thus, since the particular first sample being counted is the unquenched sample, the apparatus will display a ratio of 1.0. The standard source is then retracted in the manner previously described and the unquenched sample is subjected to a second counting cycle for a period of, say, one minute. During the second counting cycle, a certain number of counts will be recorded in the channel including scaler 88c which are, under the illustrative conditions, representative of counts emanating from the tritium isotope which, in this instance, has a known activity level of 100,000 dpm. Let it be assumed further that the scaler 88c reflects a recorded count of 63,000 counts during the one-minute counting period. The technician then knows that for that particular sample he has counted with an efficiency of (63%). Under these conditions, the technician is now able to plot the first point required to form the quench correlation curve generally depicted at 109 in FIG. 6, such point being represented at P10.

The foregoing procedure is then repeated for the second sample in the series which, in this instance, contains approximately 15 microliters of quench material. It will be found that since the second sample is quenched slightly, the counting efficiency recorded in the tritium counting channel will be somewhat less than the counting efficiency determined for the first unquenched sample, and in the illustrative instance, the second sample may show a counting efficiency of on the order of 57%. Similarly, during the automatic standardization portion of the counting period for the second sample when it is exposed to radiations emanating from external standard source material 44, it will be found that the ratio of counts recorded in the automatic standardization channels will drop slightly — for example, to approximately 0.90. Thus, the efficiency of 57% and the ratio of 0.90 determine a second point P9 on the calibration or correlation curve 109. The foregoing procedure is then repeated for each of the remaining nine samples that were prepared and the information recorded during the two counting periods for each of the samples is then entered onto the graph shown in FIG. 6. When all eleven samples have been counted and the eleven points P10–P0 plotted, the curve 109 may be drawn in. The curve 110 representative of the $^{14}$C contribution in the AB window may be prepared in a similar manner.

While the quench correlation curve 109 shown in FIG. 6 has, for exemplary purposes, been shown as a smooth curve, as a practical matter the various points P10–P0 which define it do not fall precisely on the curve. Quite to the contrary, it has been found that the points which define the quench correlation curve 109 fall in an unpredictable random distribution with some points being somewhat above the curve as indicated at 111 by way of example and other points being somewhat below the curve as indicated at 112 by way of example. Unfortunately, this random distribution of pulses can present serious problems and can lead to significant statistical errors in true activity level computations. This may be readily demonstrated by reference to the quench correlation curve 109 shown in FIG. 6 and the point 111 which is shown somewhat above that curve. Thus, let it be assumed that the technician prepared the curve 109 based upon the 11 samples which were described above and which did not include a standard sample having a quench level that produced an external standardization ratio of between 0.8 and 0.9. Under these conditions, the technician would have no way of knowing that the true efficiency for any given sample having a quench level between the points represented by the ratios 0.8 and 0.9 was not accurately represented by the smooth curve 109. Thus, if it is assumed that the technician inserted an unknown sample containing a tritium isotope into the apparatus 20 and first computed an external standardization ratio of 0.87 and then a count in the tritium counting channel of 40,000 counts per minute, it will be apparent that when he refers to the calibration curve 109, he will by extrapolation and interpolation calculate that a sample which produces an external standardization ratio of 0.87 should have a counting efficiency of approximately 55% and, therefore, an activity level of 72,727 dpm. However, as is made quite evident by the measured point 111, such a sample will not have a counting efficiency of 55% but, rather, it will have a significantly higher counting efficiency of on the order of 58% indicative of a true activity level, corrected for quenching, of 68,966 dpm. Hence even using the greatest of care with his calculations, the technician will arrive at a resultant activity level which is in error by 3,761 dpm or more than 5%.

Referring next to FIG. 14, there has been depicted a conventional quench correlation curve 114 which has here been prepared for carbon-14 ($^{14}C$) in the same manner as described above for the curves 109, 110. However, in this case, the technician being interested in $^{14}C$ counting efficiencies in the carbon-14 ($^{14}C$) CD window, the points P10–P0 which define the eleven known points on the curve are determined by measurement of eleven differently quenched standard samples containing like activity levels of a $^{14}C$ isotope — the measurements now being made in the channels including scaler 88a, 88b and 88d (FIG. 3a).

Figure 10:
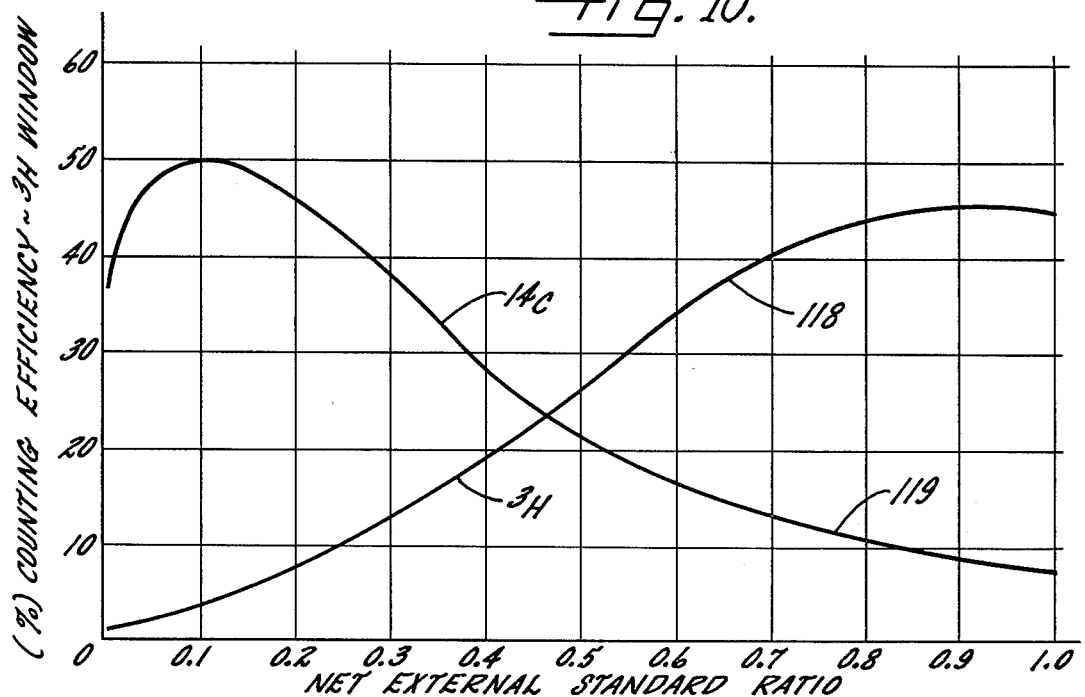

For the purpose of further facilitating and understanding of the present invention, there have been illustrated in FIGS. 8, 9 and 10 a set of exemplary counting conditions for a typical tritium isotope which differ from those depicted in FIGS. 4–6 primarily in that the gain has been increased to 100% (rather than 53%) and the window has been made somewhat narrower, thus achieving somewhat better isotope separation for dual-labeled samples but at a slight sacrifice in tritium ($^3H$) counting efficiencies. For example, let it here be assumed that an unquenched sample 24 labeled with $^3H$ and $^{14}C$ is counted in the channel containing analyzer 86e and scaler 88e (FIG. 3a). Let it further be assumed that the gain is adjusted to 100% and the discriminators in the analyzer 86e are adjusted to establish an E level of 50 discriminator divisions and an F level of 790 divisions — i.e., a window width of 740 divisions rather than 960 divisions as was the case with the AB window shown in FIG. 4. With such settings, the spectral curves for $^3H$ and $^{14}C$ in the tritium EF window might appear as indicated at 115, 116 respectively in FIG. 8.

Under these conditions, if such a sample were then severely quenched — say, sufficiently quenched to produce a net external standard ratio of 0.3000 — then the curves 115, 116 would shift from the position shown in FIG. 8 to the respective positions indicated at 115Q, 116Q in FIG. 9. However, at the higher gain setting and the narrower window setting, it will be apparent from comparison of FIG. 9 with FIG. 5 that the area within the EF window under curve 115Q is considerably greater than the corresponding area under the curve 106Q within the AB window. At the same time, the area under the $^{14}C$ curve 116Q within the EF window is considerably less than the corresponding area under the curve 108Q in the AB window. In short, more tritium counts are passed through the EF window than through the AB window while few $^{14}C$ counts pass through the EF window than the AB window, thus resulting in better isotope separation.

The corresponding quench correlation curves 118, 119 shown in FIG. 10 may be prepared in precisely the same manner as described above for the curves 109, 110 shown in FIG. 6. However, it should here be noted that the difference in gain and window settings result as a loss of approximately 15% in tritium efficiency at the unquenched end of the curve 118 when compared with the curve 109 (FIG. 6). As quenching is increased, however, the correlation curve 118 more closely approximates the curve 109 (FIG. 6).

OPTIMIZATION OF COUNTING CONDITIONS ACCORDING TO THE PRESENT INVENTION

Thus far, the environment of the invention has been described in connection with apparatus and procedures for determining sample activity levels by preparation of suitable conventional calibration curves (which are only accurate at the $m$ points which define each curve) and by thereafter measuring a variable quench correlation parameter (for example, net external standard ratios) and utilizing such measurement in conjunction with the data on the curves to compute counting efficiency and, finally, sample activity level. Moreover, there have also been described arrangements which permit automatic convergence of the measured parameter to one of the known $m$ points with attendant imposition of simulated quench upon the actual sample quench level, thus producing a predetermined effective quench level for each sample for which counting efficiencies are accurately known.

However, in each of the aforementioned environmental systems, the problem of less-than-optimum counting conditions remains substantially unchanged. That is, in each instance involving a multiple-labeled sample, increase in quenching results in poorer $^3H$ efficiencies and improved $^{14}C$ efficiencies in the tritium AB window (or the EF window of FIG. 9). At the same time, in the carbon CD window (or in the window used for virtually any single-labeled isotope) counting efficiency is degraded with increased quench while background (B) remains substantially unchanged, thus lowering the ratio $E^2/B$. The result is significantly less-than-optimum counting conditions with attendant less-than-optimum statistical validity.

In accordance with the present invention, provision is made for measuring a suitable quench indicating parameter (e.g. net external standard ratios) for each sample 24 so as to determine the actual quench level of the sample, and then utilizing such measurement to automatically readjust the preset counting windows for each isotope in the sample relative to the observed energy spectra for the isotopes so as to optimize counting conditions, the amount of such readjustment being a function of the degree of quench, either actual quench or effective quench, present in the sample. As a consequence, all samples, regardless of their actual quench conditions, are counted at optimized counting conditions so as to permit counting with optimum or near-optimum statistical validity. To this end, provision is made for automatically readjusting preset counting windows relative to the observed energy spectra by predetermined preset amounts so as to insure that in the case of multiple-labeled samples the ratio of the counting efficiency for each particular isotope to the counting efficiencies for all other isotopes is maximized in the counting window for that particular isotope while the counting efficiencies for all other isotopes are maintained constant in such window; while in the case of single-labeled samples the ratio $E^2/B$ is maximized in the counting window for the isotope in the sample.

Referring for the moment to FIG. 4, it will be recalled that the spectral curves 106, 108 respectively corresponding to the energy spectra for tritium ($^3$H) and carbon-14 ($^{14}$C) are there illustrated under an exemplary set of preset counting conditions for permitting optimized counting of tritium in the tritium AB window — viz., the standard sample is unquenched, the AB window is approximately 960 divisions wide (i.e., almost the entire available discriminator range), and the gain is established at 53%. Thus, as shown in FIG. 6, when the sample is unquenched — that is, the net external standard ratio is 1.0000 — the tritium will be counted at approximately 63% efficiency in the AB window, while the counting efficiency for carbon-14 is only 20% in the AB window. Thus, there is excellent isotope separation with consequent optimum or near-optimum statistical validity. However, as previously described and as illustrated in FIG. 6, these counting conditions are rapidly degraded with progressively increased quench.

In accordance with one form of the invention, provision is made for automatically readjusting the discriminator settings for the AB and CD windows by predetermined, preset, fixed amounts which are a function of the measured quench indicating parameter (e.g., net external standard ratio) so as to maintain constant the counting efficiency for those isotopes which are not of interest in each counting window. Thus, considering the AB window of FIGS. 4 and 5, the discriminator settings which define such window are shifted selectively and automatically so as to maintain the carbon-14 ($^{14}$C) counting efficiency in that window at the exemplary 20% (the $^{14}$C efficiency at a net external standard ratio of 1.000 for an unquenched sample as indicated by reference to FIG. 6). As a consequence of this, it has been found that the exemplary quench correlation curves 109, 110 shown in FIG. 6 will take the form of the curves 120, 121 respectively as depicted in FIG. 7.

A comparison of the curves 120, 121 shown in FIG. 7 with those shown by way of example in FIG. 6 will reveal that in the FIG. 7 arrangement as the tritium spectrum is subject to increased quenching, the tritium counting efficiency will be degraded in precisely the same manner as for the curve 109 of FIG. 6. Indeed, for all practical purposes, the curves have been found to be substantially identical, there being less than a 1% loss in $^3$H counting efficiency along the entire quench range. At the same time, since the $^{14}$C counting efficiency remains constant at 20% over the entire quench range, the ratio of $^3$H efficiency to $^{14}$C efficiency in the tritium AB window is optimized so to optimize counting conditions for tritium at the fixed gain of 53%, thereby significantly improving statistical counting validity.

While it will become apparent from the ensuing description that it is possible to shift both discriminator levels A and B (FIG. 5) automatically and independently, it has been found that when dealing with a relatively low energy isotope such as tritium, this is not necessary. Thus, as described above, when the AB window was initially established, it was desired that the window be as wide as possible. To this end, the base discriminator A was set at a discriminator level of approximately 25 divisions and, under the exemplary gain conditions such a setting is equivalent to the system coincidence threshold. Therefore, shifting the discriminator A to a lower setting will not create any significant increase in efficiency, while shifting it to a higher setting will actually reduce efficiency. However, shifting of the upper discriminator B to progressively lower settings with increased quench does serve to keep the area under the curve 108Q (FIG. 5) within the AB window such that the $^{14}$C counting efficiency in the AB window remains at the desired 20%. A typical such discriminator setting is indicated in FIG. 5 at B' where the desired $^{14}$C counting efficiency of 20% under the established counting conditions is achieved at a discriminator level of approximately 252 divisions for a severely quenched sample having a net external standard ratio of 0.3000.

Figure 11:
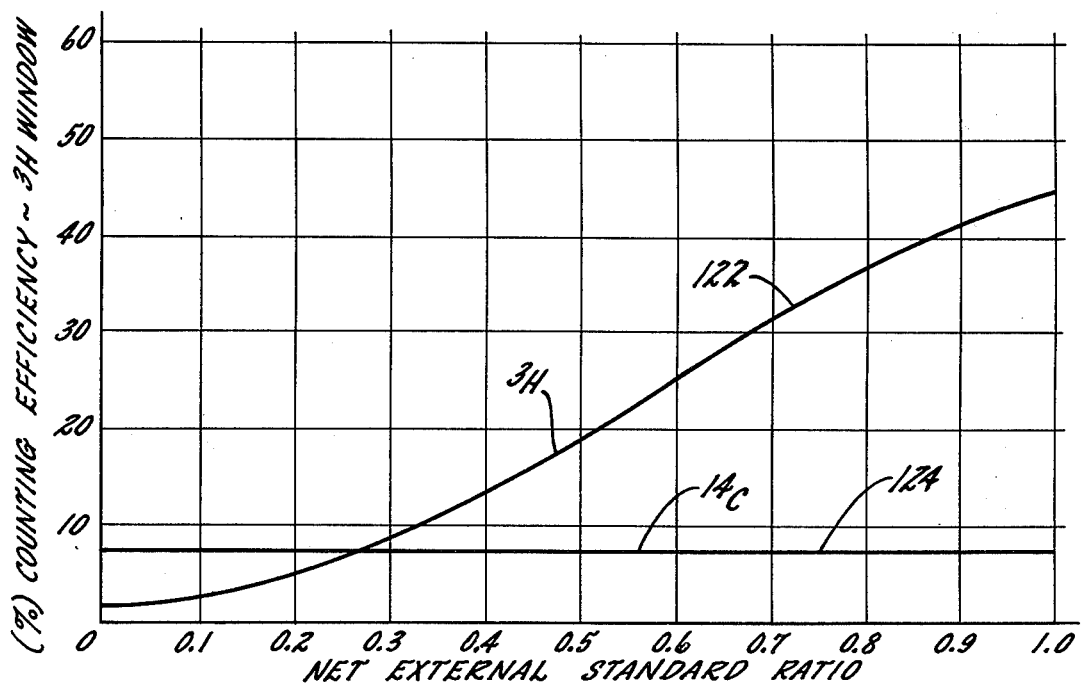

Considering next the arrangement shown in FIGS. 8–10, it will be recalled that the counting conditions there originally established were for a gain of 100% and a $^{14}$C counting efficiency of 7% in the tritium AB window. Thus, in carrying out this form of the present invention, the upper level discriminator F is automatically shifted downwardly by predetermined fixed amounts with progressively increased quench so as to maintain the $^{14}$C counting efficiency in the tritium EF window constant at 7% in precisely the same manner as the B discriminator setting described above. The resultant quench correlation curves are as shown in FIG. 11 at 122, 124 for tritium and carbon-14 respectively. A comparison of such curves with the curves 118, 119 shown in FIG. 10 will immediately emphasize the significant improvement in isotope separation with increased quench. Referring to FIG. 9, there has again been illustrated a typical setting of the upper discriminator level (here the F level) for a severely quenched sample having a net external standard ratio of 0.3000 and under 100% gain conditions — viz., a setting of 272 divisions for the F discriminator as indicated at F'.

Referring next to FIGS. 12–14 representative of conditions in the carbon-14 ($^{14}$C) CD counting window, it has been found that a similar improvement results from automatic adjustment of discriminator levels C and D. Thus, it will be recalled that in this instance the original preset optimized counting conditions for $^{14}$C at a gain of 6.5% comprised a CD window wherein the C level was set at approximately 106 divisions, and the D level at 1,000 divisions. Such a window under these conditions will produce a very low tritium contribution in the $^{14}$C window — i.e., on the order of 1% or less of $^3$H counting efficiency in the CD window for an unquenched standard. Therefore, consistent with the foregoing, it has been found that by shifting the CD levels automatically by preset fixed amounts it is possible to optimize counting conditions and to maintain the $^3$H counting efficiency in the carbon-14 CD window constant at approximately 1%.

To accomplish this, it is merely necessary to shift the base level discriminator C downwardly as the quenched $^3$H spectrum 106'Q (FIG. 13) shifts downwardly and to the left so as to maintain the $^3$H contribution in the CD window at approximately 1%. As shown in FIG. 13, with a severely quenched $^{14}$C sample, here having a net external standard ratio of 0.3000, the C level has been shifted to a level C' of approximately 24 divisions from the original level for an unquenched sample of approximately 106 divisions. At the same time, since the $^{14}$C spectrum has also been subjected to quenching — here to a level of 0.3000 in net external standard ratio — it is desirable to simultaneously shift the D level discriminator downwardly so that it is established at the upper end of the $^{14}C$ quenched spectrum. Thus, as indicated in FIG. 13, the D level discriminator is set at a level of approximately 193 divisions as indicated at D'. Controlled readjustment of the base level discriminator C as described serves to increase $^{14}C$ counting efficiency in the CD window for any given quench level, while shifting of the upper level discriminator D serves to exclude undesired background.

As a consequence, optimizing counting conditions as here described for a multiple-labeled sample will, in the CD window, significantly improve or increase the ratio of $^{14}C$ counting efficiency to $^3H$ counting efficiency. In addition, for both multiple-labeled and single-labeled isotopes the E/B ratio in the CD window will be maximized. Referring to FIG. 14, the improvement in counting efficiency for a multiple-labeled sample is reflected by the optimized $^{14}C$ quench correlation curve indicated at 125.

To further facilitate an understanding of the present invention, as well as of the preparation and use of quench correlation curves such as those shown in FIGS. 7, 11 and 14, attention is directed to FIG. 15. Thus, there are here depicted graphically a family of eleven curves 130–140, the eleven curves being plots of $^3H$ counting efficiency in a tritium window (e.g. the AB' window of FIG. 7 or the EF' window of FIG. 11) versus $^{14}C$ counting efficiencies in the same window — it being understood that the B' and F' levels will vary dependent upon quench — the eleven curves respectively corresponding to quench levels at external standard ratios of 0.0000, 0.1000, 0.2000, . . . 1.0000. If a vertical line is now drawn at, for example, the point where $^{14}C$ efficiency equals 20%, then the intercepter with the curves 130–140 will respectively define eleven points P0, P1, P2, . . . P10 which may be used to generate the $^3H$ quench correlation curve 120 shown in FIG. 7. Similarly, a vertical line drawn at a $^{14}C$ efficiency of 7% will establish eleven points defining the $^3H$ quench correlation curve in FIG. 11.

While it will be understood that the present invention is not limited to any specific discriminator settings, it has been found from experiments conducted under the conditions set forth hereinabove that excellent optimized isotope separations are achieved in multiple-labeled samples with discriminator settings (expressed in division as described above) on the order of those set forth below in TABLE I.

Referring now to FIG. 16, there has been illustrated in block and line form, an exemplary data analysis system suitable for carrying out the form of the invention hereinabove described. As shown, the diagrammatic system generally represents a simplified illustration of the system shown in FIGS. 3a and 3b, certain components having been deleted for purposes of clarity and certain additional components having been illustrated in block and line form. Consequently, those illustrated components corresponding to like components in FIGS. 3a and 3b have been designated by identical reference numbers.

TABLE I

| Net External Standard Ratio | AB Window 53% Gain | | | CD Window 6.5% Gain | | | EF Window 100% Gain | | |
|---|---|---|---|---|---|---|---|---|---|
| | A | B | Width | C | D | Width | E | F | Width |
| 1.0000 | 25 | 985 | 960 | 106 | 1000 | 894 | 50 | 790 | 740 |
| 0.9000 | 25 | 820 | 795 | 91 | 845 | 754 | 50 | 675 | 625 |
| 0.8000 | 25 | 690 | 665 | 73 | 700 | 627 | 50 | 590 | 540 |
| 0.7000 | 25 | 575 | 550 | 60 | 560 | 500 | 50 | 510 | 460 |
| 0.6000 | 25 | 465 | 440 | 48 | 440 | 392 | 50 | 435 | 385 |
| 0.5000 | 25 | 384 | 359 | 40 | 343 | 303 | 50 | 377 | 327 |
| 0.4000 | 25 | 321 | 296 | 33 | 269 | 236 | 50 | 328 | 278 |
| 0.3000 | 25 | 252 | 227 | 24 | 193 | 169 | 50 | 272 | 222 |
| 0.2000 | 25 | 215 | 190 | 19 | 145 | 126 | 50 | 242 | 192 |
| 0.1000 | 25 | 182 | 157 | 15 | 104 | 89 | 50 | 209 | 159 |
| 0.0000 | 25 | 172 | 147 | 8 | 65 | 57 | 50 | 192 | 142 |

It will be understood that the flow of pulses through the electrical programming system 75 (FIG. 16) will be identical to that previously described in conjunction with FIGS. 3a and 3b and, therefore, it should be unnecessary to repeat the description of this particular portion of the data analysis cycle. However, it may be helpful to an understanding of this particular form of the present invention to briefly describe the operation of one of the data channel pulse height analyzers 86c, 86d and 86e, — for example, the analyzer 86c which defines the AB window. It will be understood that the remaining two data analyzers 86d and 86e are identical except that in most instances at least one of the discriminators in each will be adjusted to a different level. Consequently parts internally of the two analyzers 86d and 86e have here been identified by the same numerical designation plus either a subscript d or e dependent upon which analyzer they appear in.

In order to permit pulse discrimination in the analyzer 86c on the basis of pulse heights, all output pulses from the summing amplifier 84 are passed through the variable gain control 85c and are then simultaneously presented as input signals to a pair of discriminator circuits here illustrated in block form at A and B — A being the lower level or base discriminator and B being the upper level discriminator. Except for the bias inputs to the discriminators which establish their operating levels, the two discriminators are otherwise of conventional form well known to those skilled in the art and, therefore, they will not be described in detail. It should suffice to state that each discriminator circuit A and B is of the type that will permit passage of only those pulses which exceed in value the level established by an adjustable input bias. Thus, assuming the bias provided to discriminator A is sufficient to set the A level to 25 divisions (see, e.g., FIG. 5), and assuming further that each division is equal to 0.008V., then the A discriminator will pass all pulses in excess of 0.2v. Similarly, the B discriminator will pass all pulses which exceed 7.88v., assuming that it is set to a level of 985 divisions (see, e.g., FIG. 5).

For the purpose of insuring that only those pulses which fall within the limits defined by the AB window are processed, those pulses which pass through the base discriminator A are fed through a suitable time delay device 141c and from there to the input of a normally open gate 142c. The arrangement is such that any pulse which exceeds the level of 985 divisions will pass through the B discriminator and act as a control signal to close the normally open gate 142c, thus preventing passage of pulses from the A discriminator therethrough. The delay characteristics of the delay device 141c are selected in accordance with the "rise time" for the pulses so as to insure that a pulse does not pass from the A discriminator through the gate 142c until after that same pulse has had time to rise to the B level, so that excessively large pulses will have an opportunity to close the gate. It will, therefore, be appreciated that only those pulses which exceed the A level but do not exceed the B level can pass through the gate 142c and from thence to the scaler 88c. And, of course, even those pulses which do pass through the gate 142c will not reach the scaler and be counted unless the gate 81c is opened by the simultaneous presence of a "coincidence" signal and a "start" signal.

In keeping with the invention, provision is made for automatically optimizing the setting of the AB window in response to a measured quench indicating parameter, for example, net external standard ratio. To this end, and as previously described in detail, the counts accumulated in the scalers 88a, 88b during two successive count cycles, are fed to the Computer/Analyzer Logic 92 as signals S1, S2 respectively and, the data represented thereby is used to compute a net external standard ratio which appears in the Answer Register 94 (FIG. 3b) as a five digit number. Let it be assumed that that answer is "0.9873" indicative of a slightly quenched sample with a net external standard ratio of 0.9873, the b digit (FIG. 3b) being 9. Under such conditions the decoder 99 would produce an output signal at a binary 0 level only upon its terminal b. 9, all other terminals being at the binary 1 level. Such signals are then transmitted as control input signals to all sections of a six section Optimized Window Selector 144 (FIG. 16), the six sections here being designated by the reference numerals 145–150 and serving to bias respective ones of the six discriminators A–F in the three data channels.

Assuming that the particular isotope of interest is that being analyzed in the channel including the AB window, the details of the section 146 of the Optimized Window Selector 144 have been illustrated in FIG. 17, it being section 146 that will serve to set the upper level discriminator B in accordance with the quench condition of the sample. It will be understood, however, that all of the remaining sections 145 and 147–150 are identical except for the values of the resistors utilized therein.

Referring to FIG. 17, it will be observed that the section 146 includes a set of eleven variable resistors $R_0$, $R_1$, $R_2$, ... $R_9$ and $R_{cpm}$, the values of which may be preset to establish eleven different biasing voltages for the B discriminators. As here shown the resistors are connected in parallel, one end of each being coupled to a line 151 which, in turn, is connected to any suitable source of positive potential, for example, to a terminal 152 which may be maintained at +12v. The opposite ends of the resistors $R_0$–$R_{cpm}$ are respectively connected to the collectors c of eleven normally ON transistor switches $Q_0$, $Q_1$, ... $Q_9$ and $Q_{cpm}$, the emitters e of the latter being connected through a common line 154 to ground as indicated at 155.

For the purpose of automatically switching a selected one of the eleven normally ON transistor switches to the OFF state, the bases b of the switches $Q_0$–$Q_9$ are coupled directly to respective ones of the output terminals b.0–b.9 of the decoder 99 (FIGS. 3b and 17) through resistors R, while the base b of switch $Q_{cpm}$ is coupled through a resistor r and an invertor 156 to the OFF contacts of Automatic DPM Control switch 104 (FIGS. 3a and 17). The arrangement is such that when the technician wishes to count in a CPM mode, the switch 104 is turned to the OFF position as indicated in FIG. 17 by dotted lines, thus coupling the invertor directly to a terminal 158 which is preferably maintained at a potential level of +2v. Under these conditions, the base b of switch $Q_{cpm}$ is dropped to a zero potential level, thus turning the normally ON switch $Q_{cpm}$ OFF and completing a circuit from the terminal 152 through resistor $R_{cpm}$, diode $D_{cpm}$ line 159 and load resistor $R_e$ to ground 155.

Conversely, when the DPM control switch is in the ON condition, the base b of switch $Q_{cpm}$ will be maintained at a level of approximately 2v., thus turning the switch ON and preventing completion of a circuit through the series arranged resistors $R_{cpm}$ and R. However, under these conditions, the terminal 158 will be coupled through the ON contacts of the DPM control switch 104 to one input of each of four AND gates 160–163, the latter receiving their second inputs from the b digit in the Answer Register 94 (FIG. 3b). Under these conditions, one and only one of the output terminals b.0–b.9 of the decoder 99 (FIGS. 3b and 17) will be lowered to a binary "0" level, all others being maintained at a binary 1 level.

Under the assumed set of conditions, the value of the b digit being 9, the terminal b.9 will drop to a binary 0 level and the switch $Q_9$ will be turned OFF, thus completing a circuit from terminal 152 through the series disposed resistors $R_9$, R, and a diode $D_9$ to ground 155. In like manner had the b digit been 3, the completed circuit would have included resistor $R_3$ rather than resistor $R_9$. Thus, no matter what operating mode or what sample quench level prevails, a circuit including only one of the resistors $R_0$, $R_1$, ... $R_9$ and $R_{cpm}$ will be completed from terminal 152 through resistor R to ground 155. Consequently, the voltage across load resistor $R_e$ will be a predetermined value dependent upon which of the resistors $R_0$–$R_{cpm}$ is selected. Such voltage is then applied to the input terminals of an amplifier 164, the latter having one output terminal coupled to ground and the other coupled to the B discriminator for applying a preset predetermined bias potential thereto.

It will be appreciated from the foregoing, that when the technician wishes to operate in a CPM mode at other than automatically optimized counting conditions, the DPM switch 104 will be turned OFF. This will establish the B discriminator at a particular level determined by the value of resistor $R_{cpm}$, which resistor can be readily adjusted by the technician at the main control panel in a conventional manner. On the other hand, when operating in a DPM ON mode, the particular level to which the B discriminator will be set will depend upon which of the resistors $R_0$–$R_9$ is selected which, in turn, will depend upon the value of the measured quench indicating parameter, for example, net external standard ratio. Thus considering FIG. 17 conjointly with reference to TABLE I, it will be appreciated that the value of resistor $R_9$ would be selected such that the B discriminator would be biased to a level of 795 divisions; the value of resistor $R_8$ would be selected such that the B discriminator would be biased to a level of 665 divisions; etc. Similarly, since under the exemplary counting conditions established for the AB window pursuant to TABLE I, the A discriminator remains fixed at a level of 25 divisions, it will be understood that the resistors $R_0$-$R_9$ in the section 145 of the Optimized Window Selector 144 (FIG. 16) will all have the same value — viz., a value sufficient to bias the A discriminator to a level of 25 divisions.

In carrying out the present invention in accordance with one of its preferred forms, it will be appreciated that when the pulse height analyzing windows are optimized as described above, the windows will be set in accordance with the particular one of $m$ quench levels which is measured for a given sample. Assuming that those levels correspond to the ten net external standard ratios of 0.9000, 0.8000, ... 0.0000, then when operating in a DPM mode the resistors $R_0$-$R_9$ (FIG. 17) will be selected so as to optimize the windows for optimum or near-optimum counting conditions only for those samples having a quench level of 0.9000, 8000, ... 0.0000. However, at the same time, the $b - e$ digits of the ratio will also function as described above to simulate a quench condition for the sample, thus producing an effective quench level which will cause the sample to produce counts in the scaler in a manner substantially identical to that which would have occurred had the sample been actually quenched to one of the preselected $m$ levels. Consequently, absolute activity levels are computed with optimized accuracy and at optimized counting conditions, thus producing optimum statistical validity.

Of course, those skilled in the art will readily appreciate from the foregoing that it is not essential to operate in the DPM mode in order to optimize counting conditions. For example, the equipment could be preset to automatically optimize counting conditions in all operating modes, in which event the components 160–163, 156, 158, $Q_{cpm}$, $R_{cpm}$ and $D_{cpm}$ shown in FIG. 17 could be eliminated.

It should also be pointed out at this point that while the analyzers 86$a$ and 86$b$ will be substantially identical to the analyzer 86$c$, they will differ slightly in that the bias levels for the discriminators will preferably be dialed in by the technician through a main control panel adjustment (not shown).

Thus far the invention has been described in conjunction with a system wherein the relative adjustment of the pulse height spectra and the discriminators comprises shifting the discriminator operating levels to particular points where they bear a specific predetermined relationship to the energy spectra—for example, shifting the B level to maintain the $^{14}C$ contribution in the AB window constant at 20% counting efficiency (or any other desired level); shifting the C level to keep the $^3H$ contribution in the CD window constant at 1% counting efficiency; shifting the D level to a point where it is located close to the upper end of the $^{14}C$ energy spectrum; etc. However, the invention is not so limited in its scope since it is also possible to shift the energy spectra relative to preset fixed discriminator levels so as to produce the same relative relationships between discriminator levels and energy spectra.

Thus, turning to FIG. 18, there has been illustrated a slightly modified form of the invention which is generally similar to the embodiment shown in FIG. 16, but in which the measured quench indicating parameter (e.g., net external standard ratio) is utilized to automatically and independently readjust gain in the data channels including the AB, CD and EF windows, rather than readjusting the window settings. Again, the readjustment comprises an incremental change, this time of gain, by preset predetermined amounts which are a function of the measured quench indicating parameter. To accomplish this, the signal levels present on the terminals $b.0$, $b.1$, ... $b.9$ (FIGS. 3$b$ and 18) are fed directly to the variable gain controls 85$c$, 85$d$ and 85$e$ in the data channels for the purpose of controllably changing the channel gains by preset amounts. As here shown, the variable gain controls 85$c$–85$e$ are substantially identical except for the values of the resistors contained therein. Therefore, a description of one, for example, the control 85$c$, will suffice for all.

Referring to FIG. 19, the details of a typical variable gain control 85$c$ have been illustrated. In this case, all output pulses appearing at the output terminal 166 of the summing amplifier 84 (FIGS. 3$a$ and 18) are passed through a resistance network comprising a fixed resistor $R_s$ having one end connected to the terminal 166 and the other end connected via a common line 168 to each of resistors $R_{10}$-$R_{19}$ and $R_{cpm}$. The latter resistors are arranged in parallel with respect to one another and in series with respect to resistor $R_s$. The opposite ends of the eleven resistors $R_{10}$-$R_{19}$ and $R_{cpm}$ are coupled to the collectors $c$ of respective different ones of eleven normally OFF transistor switches $Q_0$-$Q_9$ and $Q_{cpm}$. The emitters $e$ of the switches are all connected to ground 155 through a common line 169, while the bases $b$ of switches $Q_0$-$Q_9$ are coupled to respective different terminals $b.0$-$b.9$ of the decoder 99 through resistors R. Similarly, the base $b$ of the switch $Q_{cpm}$ is connected through a resistor R to the OFF contacts of the DPM control switch 104.

In this case, however, the decoder 99 is so arranged that a selected one only of its ten output terminals will be raised to a binary 1 level (i.e., a positive potential level), all others being at a binary 0 level (i.e., a zero potential level). Consequently, when in the DPM mode one of the terminals — for example, the terminal $b.2$ — will be raised to the binary 1 level, thus producing a positive potential level of approximately 2v. at the base $b$ of the transistor $Q_2$, turning the latter ON and completing a circuit from the summing amplifier terminal 166 through the series resistors $R_s$ and $R_{12}$, and now ON switch $Q_2$ and line 169 to ground 155. All other switches remain OFF.

It will be understood that if the terminal $b.9$ had been raised to the binary 1 level, the switch $Q_9$ would have been turned ON, thus completing the circuit including resistor $R_{19}$ instead of resistor $R_{12}$. On the other hand, when in the DPM OFF operating mode, all terminals $b.0$-$b.9$ will remain at the binary 0 level, while the terminal 158 will be connected to the base $b$ of switch $Q_{cpm}$ to a positive potential of approximately 2v., turning the switch ON, and completing the circuit including series resistors $R_s$ and $R_{cpm}$.

In this form of the invention the resistors $R_s$ and the selected one of resistors $R_{10}$-$R_{19}$ and $R_{cpm}$ form a voltage divider, the potential level at line 168 being dependent upon the values of the resistors. That potential level comprises a signal of readjusted gain in the case of selection of one of resistors $R_{10}$-$R_{19}$, which signal may be further amplified by any suitable means (not shown)

and then transmitted to the input terminal 170 for the pulse height analyzer 86c (FIG. 18).

As in the case of the optimized window selector 144 (FIG. 17), the values set for the resistors $R_{10}$–$R_{19}$ will determine the amount of the predetermined incremental gain adjustment required to optimize counting conditions in the various windows. While particular values of the resistors may vary widely, it may be helpful to set forth one way for calculating the values of the resistors $R_{10}$–$R_{19}$. Thus, referring to FIG. 20, there has been illustrated by way of example a typical curve 171 which is here representative of the fixed increments of gain required to optimize counting conditions in a typical AB window set for operation with an unquenched standard at a fixed gain of approximately 17% or less and an AB window ranging from 25 to 985 divisions. To accomplish this when dealing with a quenched sample exhibiting a ratio of 0.0000 the gain in the AB window would have to be increased by a factor of approximately 5.72; a ratio of 0.9000 would require an increase of gain by a factor of approximately 1.121; etc.

Keeping the foregoing in mind and recognizing that:

$$\text{Gain} = \frac{E_o}{E_i} \quad [1]$$

where $E_i$ is voltage input and $E_0$ is voltage output; and recognizing also that:

$$\frac{E_o}{E_i} = \frac{R_x}{R_s + R_x} \quad [2]$$

where $R_x$ is a particular one of the resistors $R_{10}$–$R_{19}$ shown in FIG. 19; it becomes possible to solve for $R_x$ any particular value of $R_s$ — say, for example, $R_s$ equals 100 Ω. To simplify the ensuing calculations let it also be arbitrarily assumed that normalized Gain is equal to 0.10 for an unquenched sample having a ratio of 1.0000. Thus, equations [1] and [2] may be readily solved to determine the value of each of resistors $R_{10}$–$R_{19}$. For example, solving for resistor $R_{19}$:

Gain $G_{.9} = G_{1.0} (1.121)$, or

Gain $G_{.9} = .10 (1.121) = .1121$ and $\frac{.1121}{1} = \frac{R_{19}}{100 + R_{19}}$ or: $R_{19} = 11.21 + .1121 (R_{19})$ or: $.8879 R_{19} = 11.21$ Therefore: $R_{19} \cong 12.6 \, \Omega$ Solving in the same manner for the remaining resistor values, it is found that $R_{18} \cong 16.6\Omega$, $R_{17} \cong 20.6\Omega$, $R_{16} \cong 26.9\Omega$, $R_{15} \cong 34.4\Omega$, $R_{14} \cong 44.1\Omega$, $R_{13} \cong 63.9\Omega$, $R_{12} \cong 84.3\Omega$, $R_{11} \cong 118\Omega$ and $R_{10} \cong 134\Omega$.

It will be appreciated from the foregoing that it is possible to obtain optimized or near-optimized counting conditions by either adjusting the discriminator levels by predetermined fixed amounts, or by adjusting gain by predetermined fixed amounts independently in each channel, in both cases the amount of adjustment being a function of the value of a measured or measurable quench indicating parameter. In either case the desired result is to maximize the ratio of $^3H/^{14}c$ counting efficiencies in the $3_H$ window and to maximize the ratio of $E^2/B$ in the counting window used with single-labeled samples. Preferably this is accomplished by adjusting the energy spectra relative to the counting windows so that those isotopes not of interest in any given window are maintained at the same counting efficiency in that window for each of $m$ selected levels of sample quench. And, preferably the samples are subjected to simulated quench so as to cause their effective quench levels to converge to the same one of the $m$ levels for which optimized counting conditions are established.

It is also contemplated that in some instances it may be desirable to optimize counting conditions by simultaneously shifting discriminator setting and adjusting gain. For example, in the carbon -14 (14C) CD window (FIGS. 12 and 13), it might be desirable under certain counting conditions to utilize a gain of 6.5% for net external standard ratios from 1.000 to 0.4000, while utilizing a gain of 30% for ratios of 0.3000 to 0.0000. In this case the data set forth in TABLE I would be modified as shown in TABLE II:

TABLE II

| NET EXTERNAL STANDARD RATIO | CD WINDOW C | D | WIDTH |
|---|---|---|---|
| 0.3000 | 111 | 891 | 780 |
| 0.2000 | 88 | 669 | 581 |
| 0.1000 | 69 | 480 | 411 |
| 0.0000 | 37 | 300 | 263 |

In the event that the feature of optimized counting conditions as described herein is used in conjunction with a system incapable of simulating quench conditions to cause convergence to a predetermined effective quench level, it will be understood while excellent improvement will exist in the actual counting conditions, such improvement will be somewhat less than could otherwise be achieved. In this case, it would be desirable to select resistor values such that the counting conditions are optimized to the best possible extent over each of $m$ ranges of external standard ratios or the like such, for example, or over a range extending from a ratio of 0.4000 to 0.4999.

It will be understood that while the present invention has herein been described in conjunction with ten preselected quench levels for which conditions are optimized —viz., external standard ratios of 0.9000, 0.8000, ... 0.000, there is no requirement that there be ten such levels. To the contrary, there may be more or fewer than ten levels; the levels may be either equally or unequally spaced; and they may fail at any point within the range of the selected parameter. Moreover, the parameter may be other than net external standard ratios. For example, it may be net external standard counts, channels ratios, or other available parameters which are numerically indicative of quench level.

We claim as our invention:

1. Apparatus for optimizing counting conditions in test samples containing $n$ radioactive isotopes disposed in a liquid scintillator with each isotope being of the type that produces an observable energy spectrum, said apparatus comprising a light transducer, means for positioning a sample adjacent said transducer in light transmissive relationship therewith, means for measuring a selected quench indicating parameter indicative of the quench level of the sample, $n$ pulse height analyzers for analyzing pulses emanating from said transducer, said $n$ pulse height analyzers each including means for discriminating pulses on the basis of pulse heights, and means responsive to the value of said measured quench indicating parameter for automatically adjusting said discriminating means relative to the observed spectrum for each isotope, said adjusting means being characterized by its ability to adjust said discriminating means relative to the observed spectrum for each isotope by one of $m$ predetermined, preset, amounts selected in response to the value of said measured parameter and corresponding to preselected quench levels at which counting efficiencies are accurately known.

2. Apparatus as set forth in claim 1 further characterized in that $n$ is equal to at least two, and said adjusting means are operative to adjust said discriminating means relative to the observed spectra so as to maintain the counting efficiency for each of said $n$ isotopes at preselected constant values in given different ones of said pulse height analyzers irrespective of the value of quench occurring in the sample.

3. Apparatus as set forth in claim 1 further characterized in that each of said $n$ pulse height analyzers include a base level discriminator and an upper level discriminator, said adjusting means being operable to automatically readjust said upper level discriminator by a predetermined preset, fixed amount in response to the value of said measured quench indicating parameter so as to optimize the ratio $E^2/B$ in a selected one of said $n$ pulse height analyzers upon measurement of samples containing only a single isotope (where E equals the counting efficiency and B equals background noise.)

4. Apparatus as set forth in claim 2 further characterized in that said discriminator means in a first one of said $n$ pulse height analyzers includes a base level discriminator and an upper level discriminator defining a first counting window for counting the least energetic one of said $n$ isotopes, said discriminator means in a second one of said $n$ pulse height analyzers having a base level discriminator and an upper level discriminator defining a second counting window for counting a more energetic one of said $n$ isotopes, said adjusting means being adapted (1) to adjust the level of said upper level discriminator in said discriminator means in said first pulse height analyzer by one of $m$ predetermined, preset, fixed amounts at $m$ different values of said measured parameter so as to maintain the counting efficiency of said more energetic isotope at a constant level in said first window for each of said $m$ values, and (2) to adjust the level of said base level discriminator in said discriminator means is said second pulse height analyzer by one of $m$ predetermined, preset, fixed amounts at said $m$ values of said measured parameter so as to maintain the counting efficiency of said least energetic isotope at a constant level in said second window for each of said $m$ values.

5. Apparatus as set forth in claim 4 further characterized in that said adjusting means is adapted to (3) adjust said upper level discriminator in said discriminator means in said second pulse height analyzer by a predetermined, preset, fixed amount at said m values of said measured parameter so as to exclude at least a portion of unwanted background noise and thereby maximize the ratio $E^2/B$ in said second window (where E equals the counting efficiency for said more energetic isotope in said second window and B equals the background noise).

6. Apparatus as set forth in claim 1 further characterized in that means are provided in tandem with each of said $n$ pulse height analyzers for controlling varying gain, said adjusting means being operable to automatically readjust said gain varying means by a predetermined, preset, fixed amount in response to the value of said measured quench indicating parameter so as to optimize the ratio $E^2/B$ in a selected one of said $n$ pulse height analyzers upon measurement of samples containing only a single isotope (where E equals the counting efficiency and B equals the background noise).

7. Apparatus as set forth in claim 2 further characterized in that means are provided in tandem with each of said $n$ pulse height analyzers for controlling varying gain, said discriminator means in a first one of said $n$ pulse height analyzers having a base level discriminator and an upper level discriminator defining a first counting window for counting the least energetic one of said $n$ isotopes, said discriminator means in a second one of said $n$ pulse height analyzers having a base level discriminator and an upper level discriminator defining a second counting window for counting a more energetic one of said isotopes, said adjusting means being operable to automatically readjust said gain varying means in tandem with said first window by one of $m$ predetermined, preset, fixed amounts at m values of said measured parameter so as to maintain the counting efficiency of said more energetic isotope at a constant level in said first window for each of said $m$ values, said adjusting means being also operable to automatically readjust said gain varying means in tandem with said second window by one of $m$ predetermined, preset, fixed amounts at m values of said measured parameter so as to maintain the counting efficiency of said least energetic isotope at a constant level in said second window for each of said $m$ values.

8. Apparatus as set forth in claim 1 further characterized in that said parameter is net external standard ratio.

9. Apparatus as set forth in claim 1 further characterized in that convergence means are provided for causing said measured quench indicating parameter to converge to a particular one of $m$ values of said measured parameter for each of which m values isotope counting efficiencies are accurately known whereby optimized counting conditions and optimized computational accuracy are achieved during a single analysis cycle for each sample.

10. Apparatus as set forth in claim 9 further characterized in that said adjusting means and said convergence means are both operable in response to the value of said measured parameter whereby a simulated quench condition is imposed upon each sample sufficient to create an effective quench level for the sample identical to one of said $m$ values, so that absolute sample activity levels are computed at accurately known counting efficiencies corresponding to the particular one of said $m$ levels and counting conditions are optimized at said particular one of said $m$ levels irrespective of the actual quench level of said sample.

11. An apparatus of the type for analyzing test samples subject to quench and of the type containing one or more radioactive isotopes disposed singly or multiply in a liquid scintillator with each isotope being of the type that produces an observable energy spectrum, and wherein said apparatus includes means for creating a simulated quench condition for each sample so as to establish for such sample a selected one of $m$ predetermined effective quench levels for each of which isotope counting efficiencies are accurately known, the combination with said means for simulating quenching of $n$ pulse height analysis means for discriminating pulses on the basis of their heights, means for measuring a quench indicating parameter for each sample so as to determine the actual quench level of each sample, and means responsive to the value of the measured parameter for adjusting each of said $n$ pulse height analysis means independently of one another by controlled predetermined fixed amounts which are a function of the value of the measured parameter, so that when utilizing said apparatus for analyzing multiple labeled samples the contributions of isotopes not of interest in any given one of said $n$ analysis means are maintained constant and so that when analyzing a single-labeled sample in any given one of said $n$ analysis means the ratio $E^2/B$ is maximized (where E equals the counting efficiency and B equals background noises).

12. Apparatus as set forth in claim 11 further characterized in that said parameter is net external standard ratio.

13. Apparatus as set forth in claim 11 further characterized in that both said simulated quench creating means and said adjusting means are operated in response to said measured parameter whereby the degree of simulated quench and the degree of said predetermined fixed amounts of adjustment of said analysis means are a function of the value of said measured parameter.

14. The method of optimizing counting conditions when measuring activity levels of test samples containing n one or more radioactive isotopes disposed in a liquid scintillator comprising the steps of
  a. measuring a quench indicating parameter for each sample to provide an indication of sample activity level, and
  b. automatically adjusting n discriminators utilized in analyzing pulses on the basis of their heights relative to the spectra of pulse heights by predetermined amounts, corresponding to preselected quench levels at which counting efficiencies are accurately known, in response to measurement of the parameter, with the degree of such adjustment being controlled as a function of the value of the measured parameter.

15. The method as set forth in claim 14 further characterized in that during step (b) the adjustment made is controlled so as to maintain constant the contributions of any isotope not of interest in any given pulse height analyzing channel.

16. The method as set forth in claim 14 further characterized in that during step (b) the adjustment made serves to maximize the ratio $E^2/B$ in the analysis channels utilized for counting single-labeled samples and in the analysis-channels utilized for counting the most energetic isotopes of a multiple-labeled isotope (where E equals counting efficiency and B equals background noise).

17. The method as set forth in claim 14 further characterized in that subsequent to step (a) and during at least one of the periods prior to, during and subsequent to step (b) a simulated quench condition is imposed upon the test sample for the purpose of creating a preselected effective quench level for which counting efficiencies are accurately known.

18. The method as set forth in claim 17 further characterized in that the degree of simulated quench imposed upon the sample is controlled as a function of the value of the parameter measured during step (a).

19. The method as set forth in claim 14 further characterized in that during step (b) selected ones of the discriminators are shifted in predetermined fixed amounts to define different width analysis windows with the relocated discriminator levels bearing predetermined relationships with respect to the energy spectra for the sample.

20. The method as set forth in claim 19 further characterized in that the upper level discriminator in a window utilized for analysis of a relatively low energy isotope is shifted by an amount sufficient to maintain the counting efficiencies of higher energy isotopes in that window at a constant predetermined level.

21. The method as set forth in claim 20 further characterized in that the base level discriminator in a window utilized for analysis of a relatively high energy isotope is shifted by an amount sufficient to maintain the counting efficiencies of lower energy isotopes in that higher energy window at a constant predetermined level.

22. The method as set forth in claim 21 further characterized in that the higher level discriminator in the higher energy window is shifted by an amount sufficient to locate the discriminator level adjacent the upper end of the spectra for the higher energy isotope.

23. The method as set forth in claim 14 further characterized in that during step (b) the gain of pulses passing through a given low energy isotope counting window of fixed preset bandwidth are automatically increased by predetermined fixed amounts so as to insure that the contribution of counts produced by a relatively high energy isotope is maintained constant in the low energy window.

24. The method as set forth in claim 23 further characterized in that during step (b) the gain of pulses passing through a given high energy isotope counting window of fixed preset bandwidth are automatically increased by predetermined fixed amounts so as to insure that the contribution of counts produced by a relatively low energy isotope is maintained constant in the high energy window.

25. The method as set forth in claim 19 further characterized in that during step (b) at least certain of the gain settings are automatically shifted by predetermined fixed amounts.

26. The method as set forth in claim 25 further characterized in that such shifted gain settings are those gain settings in the higher energy window corresponding to severely quenched samples.

27. Apparatus as set forth in claim 1 further characterized in that $n$ is equal to at least two and said adjusting means are operative to adjust the operating level of said discriminating means so as to maintain the counting efficiency for each of said $n$ isotopes at preselected constant values in given different ones of said pulse height analyzers irrespective of the value of quench occurring in the sample.

28. The method as set forth in claim 14 further characterized in that $n$ is equal to at least two, and the operating level of said discriminators is adjusted to maintain the counting efficiency for each of said $n$ isotopes at preselected constant values in given different ones of said discriminators irrespective of the value of quench occurring in the sample.

* * * * *